(12) United States Patent
Mikawa et al.

(10) Patent No.: US 8,713,479 B2
(45) Date of Patent: Apr. 29, 2014

(54) IMAGE PROCESSING APPARATUS, IMAGE PROCESSING METHOD, AND PROGRAM

(75) Inventors: Takuma Mikawa, Kawasaki (JP); Yoko Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 12/478,327

(22) Filed: Jun. 4, 2009

(65) Prior Publication Data

US 2009/0303341 A1    Dec. 10, 2009

(30) Foreign Application Priority Data

Jun. 5, 2008  (JP) .................................. 2008-148317
May 25, 2009  (JP) .................................. 2009-125850

(51) Int. Cl.
*G06F 3/048* (2013.01)
(52) U.S. Cl.
USPC ........................................................ 715/838
(58) Field of Classification Search
USPC ........................................................ 715/838
See application file for complete search history.

(56) References Cited

U.S. PATENT DOCUMENTS

| 5,898,436 A * | 4/1999 | Stewart et al. ................. 345/594 |
| 7,457,483 B2 | 11/2008 | Tokiwa |
| 2002/0126149 A1* | 9/2002 | Umeda ........................... 345/769 |
| 2006/0136803 A1* | 6/2006 | Erol et al. ...................... 715/500 |
| 2008/0072166 A1* | 3/2008 | Reddy ............................ 715/764 |

FOREIGN PATENT DOCUMENTS

| JP | 2001-177731 A | 6/2001 |
| JP | 2003-299116 A | 10/2003 |
| JP | 2004-170970 A | 6/2004 |
| JP | 2004-304712 A | 10/2004 |
| JP | 2005-258578 | 9/2005 |
| JP | 2008-283291 A | 11/2008 |

* cited by examiner

*Primary Examiner* — Aaron M Richer
(74) *Attorney, Agent, or Firm* — Cowan, Liebowitz & Latman, P.C.

(57) ABSTRACT

An image processing apparatus for applying image processing to image data by adjusting values of a plurality of adjustment items, comprises an acquisition unit configured to acquire a characteristic of the image data by analyzing the image data, a decision unit configured to decide an order of settings of the values of the plurality of adjustment items based on the acquired characteristic of the image data, and a display unit configured to display value setting fields used to set the values of the adjustment items on a screen in accordance with the decided order.

21 Claims, 18 Drawing Sheets

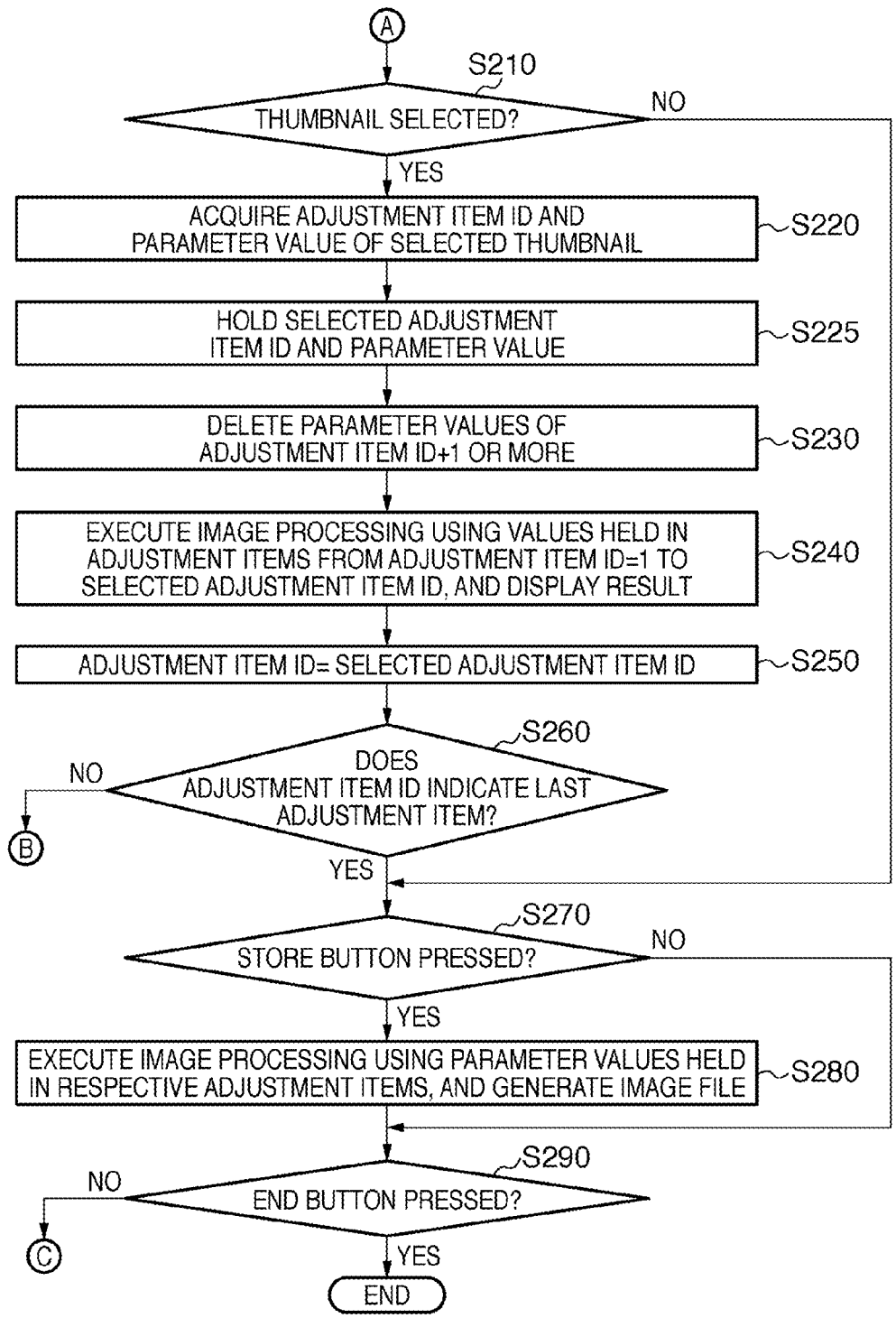
F I G. 1B

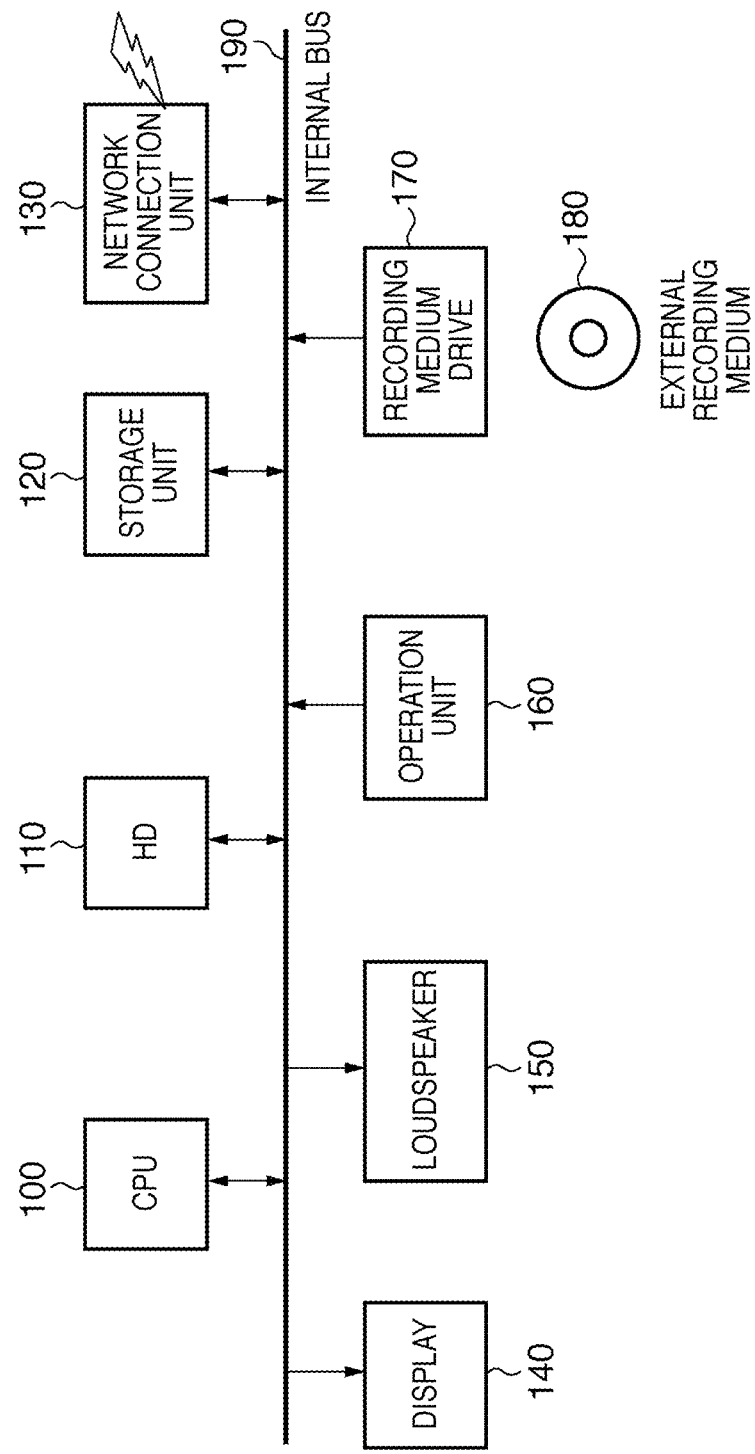

FIG. 4

| ID | name | Param1 | Param2 | Param3 | Param4 | Param5 | Value |
|---|---|---|---|---|---|---|---|
| 1 | EXPOSURE COMPENSATION | -5 | -3 | 0 | +3 | +5 | |
| 2 | TONE CURVE | 0:0 | 80:128 | 128:128 | 128:200 | 255:255 | |
| 3 | CONTRAST | 1 | 2 | 3 | 4 | 5 | |

FIG. 16A

| ADJUSTMENT ITEM ID / TYPE | ID1 | ID2 | ID3 | ID4 | ID5 |
|---|---|---|---|---|---|
| Type1 | WHITE BALANCE | EXPOSURE COMPENSATION | TONE CURVE | CONTRAST | COLOR DENSITY |
| Type2 | EXPOSURE COMPENSATION | WHITE BALANCE | TONE CURVE | COLOR DENSITY | CONTRAST |
| Type3 | EXPOSURE COMPENSATION | WHITE BALANCE | CONTRAST | TONE CURVE | COLOR DENSITY |
| Type4 | WHITE BALANCE | EXPOSURE COMPENSATION | CONTRAST | COLOR DENSITY | TONE CURVE |
| ... | | | ... | | |

FIG. 16B

| PARAMETER Index / ADJUSTMENT ITEM NAME | Param1 | Param2 | Param3 | Param4 | Param5 |
|---|---|---|---|---|---|
| EXPOSURE COMPENSATION | −5 | −3 | 0 | +3 | +5 |
| TONE CURVE | 0:0 | 80:128 | 128:128 | 128:200 | 255:255 |
| CONTRAST | 1 | 2 | 3 | 4 | 5 |
| ... | ... | ... | ... | ... | ... |

IMAGE PROCESSING APPARATUS, IMAGE PROCESSING METHOD, AND PROGRAM

BACKGROUND OF THE INVENTION

1. Field of the Invention

The present invention relates to a technique which presents, to the user, the setting order of a plurality of adjustment items upon applying image processing to image data for each of the plurality of adjustment items.

2. Description of the Related Art

In recent years, along with the prevalence of digital cameras, the user himself or herself freely adjusts parameters used upon applying image processing to image data to generate image data with image quality of his or her choice. The image processing includes various adjustment items such as exposure compensation, white balance, and level compensation. It is a common practice to adjust parameters of these plurality of adjustment items in the order decided by the user himself or herself.

In such situation, the parameter adjustments of respective adjustment items influence the image processing results to each other. For this reason, it is difficult for the user to discriminate how the parameter adjustments of respective adjustment items are reflected to the processing results. Therefore, the user has to repeat the parameter adjustments of the plurality of adjustment items and the confirmation of the processing results.

The user often does not recognize from which adjustment item of many adjustment items the image processing is to be started to promptly obtain a desired processing result. The user has to repeat the parameter adjustments of the plurality of adjustment items and the confirmation of the processing results through trial and error processes, resulting in troublesome operations.

SUMMARY OF THE INVENTION

The present invention has been made in consideration of the aforementioned problems, and implements a technique for presenting, to the user, the setting order of a plurality of adjustment items upon applying image processing to image data using a parameter adjusted for each adjustment item.

In order to solve the aforementioned problems, the present invention provides an image processing apparatus for applying image processing to image data by adjusting values of a plurality of adjustment items, comprising: an acquisition unit configured to acquire a characteristic of the image data by analyzing the image data; a decision unit configured to decide an order of settings of the values of the plurality of adjustment items based on the acquired characteristic of the image data; and a display unit configured to display value setting fields used to set the values of the adjustment items on a screen in accordance with the decided order.

The present invention also provides an image processing method for applying image processing to image data by adjusting values of a plurality of adjustment items, comprising: an acquisition step of acquiring a characteristic of the image data by analyzing the image data; a decision step of deciding an order of settings of the values of the plurality of adjustment items based on the acquired characteristic of the image data; and a display step of displaying value setting fields used to set the values of the adjustment items on a screen in accordance with the decided order.

The present invention also provides a computer-readable storage medium, which stores a software program that causes a computer execute as an image processing apparatus, which applies image processing to image data by adjusting values of a plurality of adjustment items, comprising: an acquisition unit configured to acquire a characteristic of the image data by analyzing the image data; a decision unit configured to decide an order of settings of the values of the plurality of adjustment items based on the acquired characteristic of the image data; and a display unit configured to display value setting fields used to set the values of the adjustment items on a screen in accordance with the decided order.

According to the present invention, upon applying image processing to image data by adjusting parameters of a plurality of adjustment items, since the setting order of the plurality of adjustment items is presented, thus reducing the load on user's operations associated with image processing.

Further features of the present invention will become apparent from the following description of exemplary embodiments with reference to the attached drawings.

BRIEF DESCRIPTION OF THE DRAWINGS

FIGS. 1A and 1B are flowcharts showing an example of the operation sequence of an image processing apparatus according to the present invention;

FIG. 2 is a block diagram showing an example of the arrangement of the image processing apparatus according to the present invention;

FIG. 4 is a view showing an example of a table used to manage parameters of adjustment items according to the present invention;

FIGS. 16A and 16B are views showing an example of tables used to manage information associated with adjustment items according to the present invention.

DESCRIPTION OF THE EMBODIMENTS

Figure 1A:
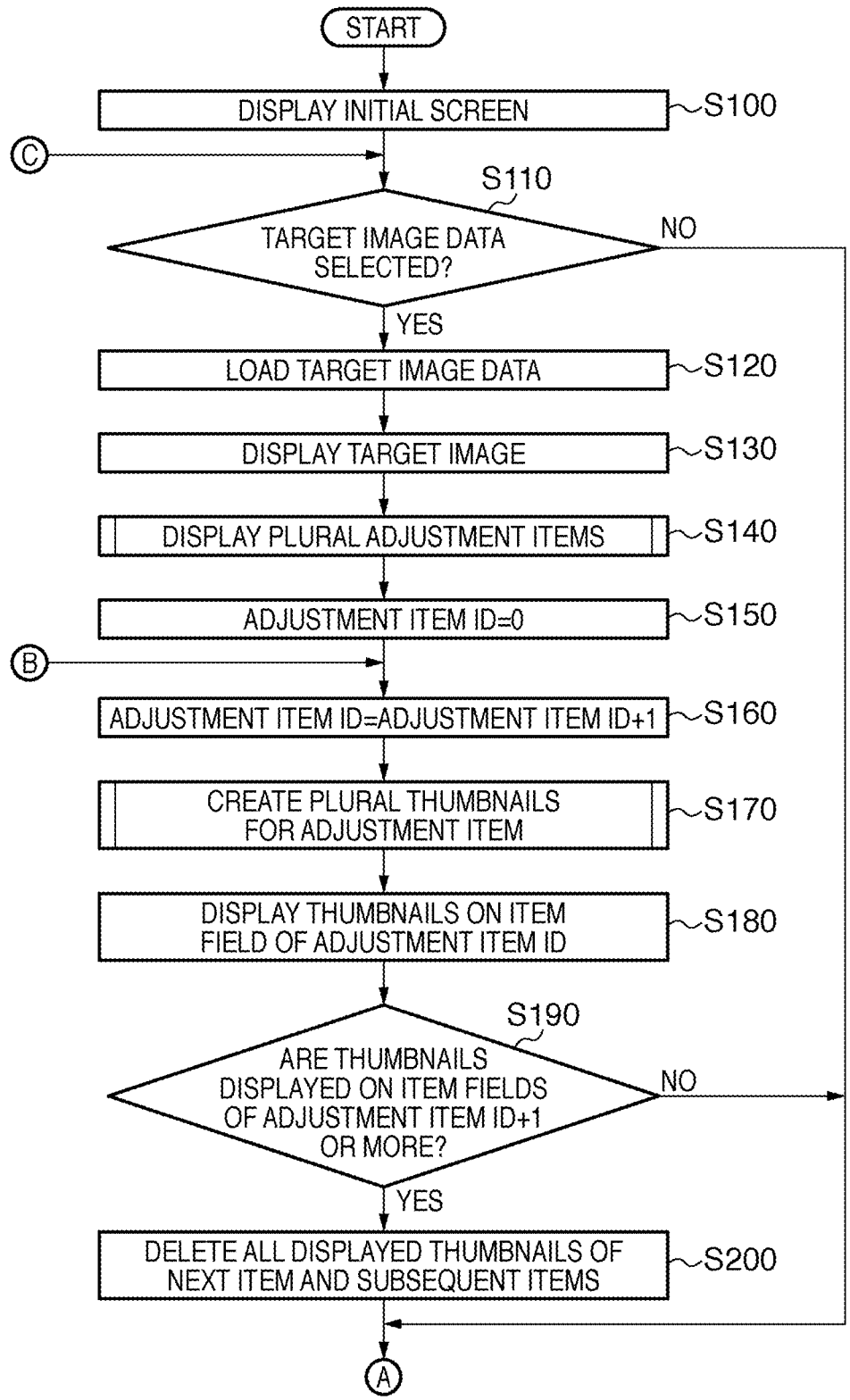

The best mode for carrying out the present invention will be described in detail hereinafter with reference to the accompanying drawings.

Note that embodiments to be described hereinafter are examples for achieving the present invention and should be appropriately modified or changed depending on the arrangements of apparatuses and various conditions to which the present invention is applied, and the present invention is not limited to the following embodiments.

First Embodiment

This embodiment will exemplify a case in which three adjustment items ("exposure compensation", "tone curve", and "contrast") of RAW image data are processed in the order of 1: "exposure compensation", 2: "tone curve", and 3: "contrast", and the processed image data is stored as JPEG image data. The RAW image data is image data stored in a format unique to an image sensing apparatus.

In this embodiment, a list of RAW image data in a folder designated at the startup timing is displayed, and RAW image data selected by a user's operation is used as an adjustment target image. Note that this embodiment is premised on that the folder is designated at the startup timing, but a folder may be selected during startup. In this embodiment, an adjustment target image (original image) is selected by a user's operation during startup, but it may have already been selected at the startup timing.

FIG. 2 is a block diagram showing the arrangement of an image processing apparatus according to an embodiment of the present invention.

Referring to FIG. 2, reference numeral 100 denotes a central processing unit (CPU) which executes an image processing program. Reference numeral 110 denotes a hard disk which records an OS, application programs, and digital data such as image data. The hard disk 110 records an image processing program to be described later as a program code readable by the CPU 100, and the CPU 100 executes this program code. Reference numeral 120 denotes a storage unit which stores a program code and the like. Reference numeral 130 denotes a network connection unit which is used to connect an external apparatus that collects image data via a network, and publishes the corrected image data. Reference numeral 140 denotes a display unit (display) such as a CRT or LCD panel. Reference numeral 150 denotes an audio output loudspeaker. Reference numeral 160 denotes an operation unit including a keyboard and pointing device.

Reference numeral 170 denotes a recording medium drive used to read data stored in an external recording medium 180. Reference numeral 180 denotes an external recording medium such as a CD-ROM or DVD. Reference numeral 190 denotes an internal bus such as a PCI bus which interconnects respective processing units in the computer. In this embodiment, image data and programs are stored in the hard disk 110. Alternatively, image data and programs may be recorded in the external recording medium 180 such as a CD-ROM or DVD, and the CPU 100 may execute them via the recording medium drive 170. Likewise, image data and programs may be recorded on a network, and the CPU 100 may execute them via the network connection unit 130.

FIGS. 1A and 1B are flowcharts showing the sequence of the image processing program to be executed by the image processing apparatus shown in FIG. 2. The image processing program of this embodiment is executed to have a folder path including RAW image data at the startup timing as an argument. The image processing program has an adjustment item parameter table in which a plurality of parameters are set in correspondence with adjustment items, as shown in FIG. 4. This embodiment will exemplify a case in which the user's operation sequence is as follows, and UI screens shown in FIGS. 5 to 11 are displayed in turn. However, the present invention is not limited to such specific processing.

Figure 5:
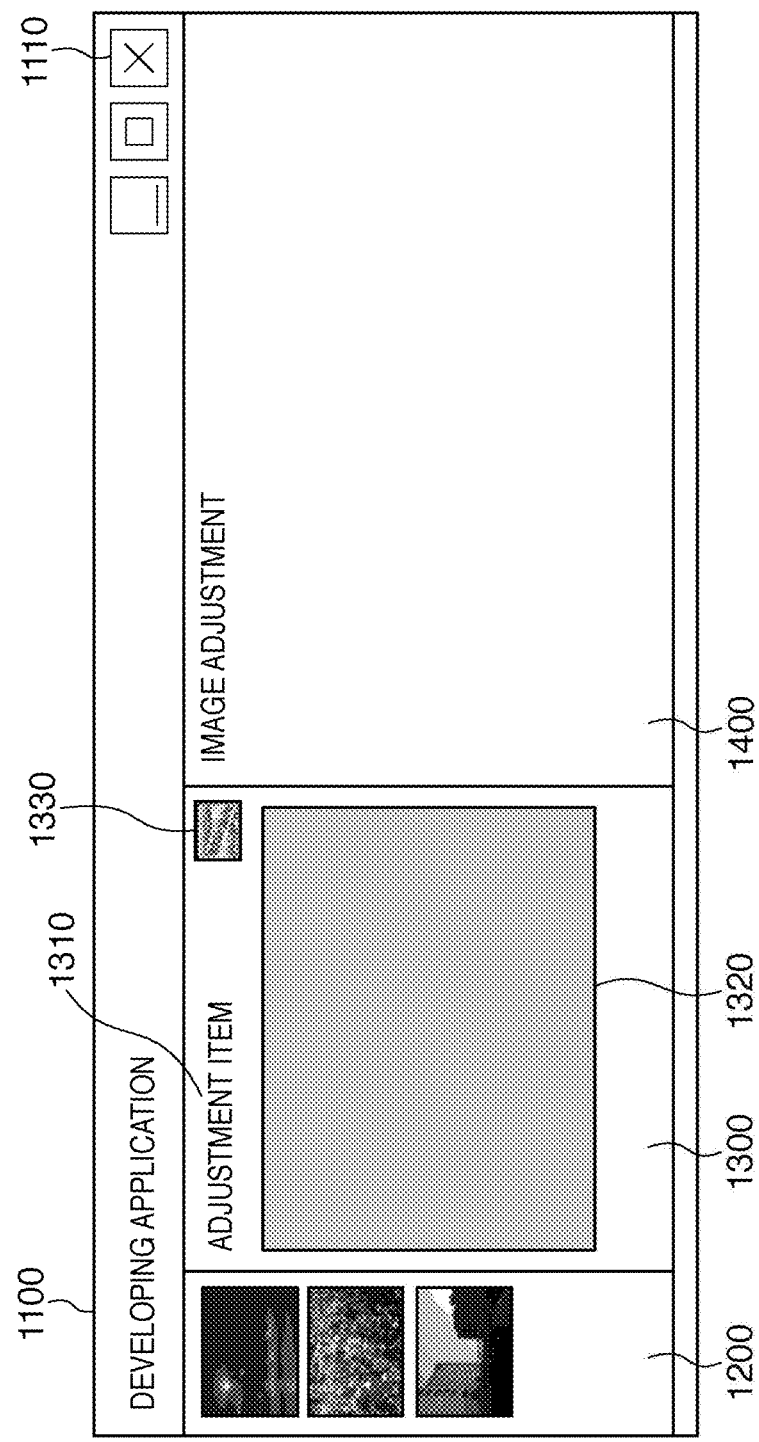
FIG. 5 is a view showing an example of a screen displayed by the image processing apparatus according to the present invention.

(1) Startup
(2) Select adjustment target image
(3) Select "exposure compensation" parameter
(4) Re-select "exposure compensation" parameter
(5) Select "tone curve" parameter
(6) Select "contrast" parameter
(7) Store
(8) Re-re-select "exposure compensation" parameter Referring to FIGS. 1A and 1B, an image selection screen 1100 shown in FIG. 5 as an initial screen is displayed (S100), and the control waits for a user's operation input.

The image selection screen 1100 shown in FIG. 5 includes a program end button 1110, RAW image selection area 1200, image display area 1300, and adjustment item list display area 1400. The RAW image selection area 1200 displays a list of image data in a RAW image data format as adjustment targets, and allows the user to select an adjustment target image. The image display area 1300 displays currently processed image data in the screen. This image display area 1300 includes a currently adjusted item name 1310, target image display area 1320, and adjusted image store button 1330. The adjustment item list display area 1400 allows the user to decide parameters associated with all adjustment items of image processing. On the initial screen shown in FIG. 5, since no adjustment target image in the RAW image selection area 1200 is selected, an adjustment target image is not decided yet. In this state, the currently adjusted item name 1310 and target image display area 1320 are grayed out, and the adjusted image store button 1330 is inhibited from being used. The adjustment item list display area 1400 displays nothing.

If the user selects one of image data in the RAW image selection area 1200 by clicking during an input waiting period after the initial screen in FIG. 5 is displayed (YES in S110), the selected image data is displayed in a selected state. The selected image data is loaded (S120), and the target image data is displayed on the target image display area 1320 in FIG. 5 (S130). The operable adjusted image store button 1330 is displayed. Furthermore, all adjustment item names "exposure compensation", "tone curve", and "contrast" are acquired from the parameter table shown in FIG. 4, and are displayed on the adjustment item list display area 1400 in FIG. 5 (S140). A variable "adjustment item ID" used to acquire an adjustment item is set to be "0" (S150), and a count of the variable "adjustment item ID" is incremented by 1 (S160). Then, a thumbnail creation program shown in FIG. 3 used to create a plurality of thumbnails (reduced-scale image data) for one adjustment item is executed (S170).

Figure 3:
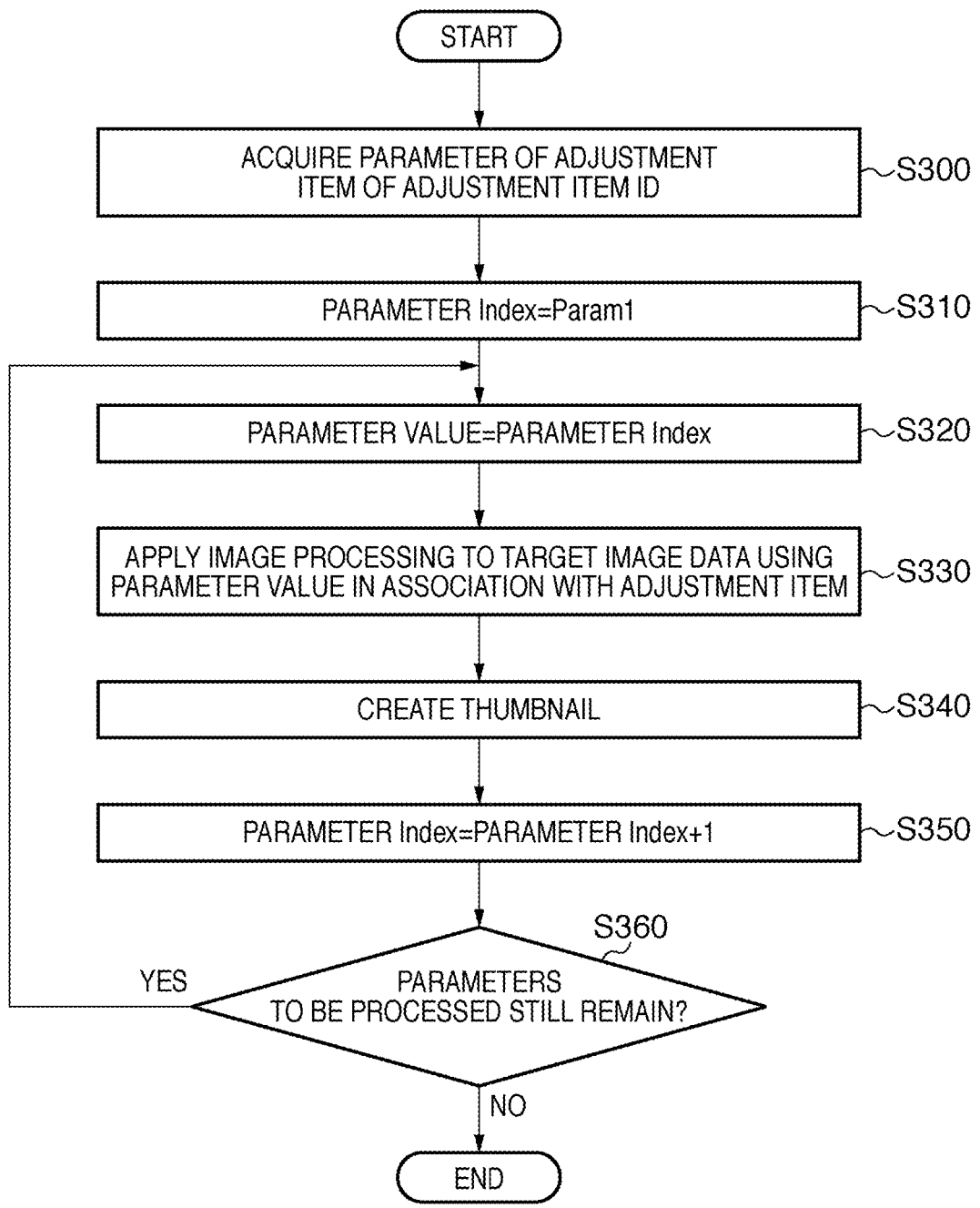
FIG. 3 is a flowchart showing an example of the operation sequence of the image processing apparatus according to the present invention.

FIG. 3 is a flowchart showing the sequence of the thumbnail creation program in S170 in FIG. 1A.

Referring to FIG. 3, a plurality of processing parameters of one adjustment item are acquired from the parameter table in FIG. 4 based on the variable "adjustment item ID" (S300). A value "parameter Index" used to acquire a parameter value is set to be "Param1" (S310), and a "parameter value" corresponding to the value "parameter Index" is acquired (S320). Image processing is applied to the target image data using the acquired "parameter value" (S330), and a thumbnail of the processed image is created (S340). If the value "parameter Index" falls within a range from "Param1" to "Param5" (YES in S360), the image processing (S330) and thumbnail creation processing (S340) are repeated. After a plurality of thumbnails are created using all the processing parameter values (NO in S360), the thumbnail creation processing in FIG. 3 ends, and the process advances to S180 in FIG. 1A. In S180 in FIG. 1A, the plurality of thumbnails created by the processing shown in FIG. 3 are displayed on a thumbnail display area of the adjustment item corresponding to the variable "adjustment item ID" (S180).

An example in which the user selects the second uppermost image data displayed on the RAW image selection area 1200 in FIG. 5 will be explained below. When image data in the RAW image selection area 1200 is selected, YES is determined in S110 in FIG. 1A, and the second uppermost image data displayed on the RAW image selection area 1200 is loaded (S120). The loaded image data is displayed on the target image display area 1320 (S130). Furthermore, all the adjustment item names "exposure compensation", "tone curve", and "contrast" are acquired from the parameter table in FIG. 4, and are displayed as a list on the adjustment item list display area 1400 in the set processing order (S140). Then, the variable "adjustment item ID" used to acquire an adjustment item is set to be "0" (S150), and a count of the variable "adjustment item ID" is incremented by 1 (S160). In order to create a plurality of thumbnails corresponding to the variable "adjustment item ID"="1", the thumbnail creation processing in FIG. 3 is executed (S170).

In FIG. 3, five "parameter values" "−5", "−3", "0", "+3", and "+5" corresponding to the variable "adjustment item ID"="1" are acquired from the parameter table in FIG. 4 (S300). Then, image processing of the adjustment item "exposure compensation" corresponding to the variable "adjustment item ID"="1" (S330) and thumbnail creation processing (S340) are repetitively executed using the acquired five "parameter values". After thumbnails using the five "parameter values" are created (NO in S360), the processing in FIG. 3 ends, and the process returns to S170 in FIG. 1A. The five thumbnails created by the processing in FIG. 3 are displayed on an "exposure compensation" thumbnail display area corresponding to the variable "adjustment item ID"="1" (S180). It is then determined if thumbnails are displayed on fields of adjustment items "tone curve" and "contrast" corresponding to the incremented count values "2" or more of the variable "adjustment item ID". Since these thumbnails are not displayed in FIG. 5 (NO in S190), the control waits for a user's input operation. At this time, the UI screen has a state immediately after the adjustment target image is selected, as shown in FIG. 6.

Figure 6:
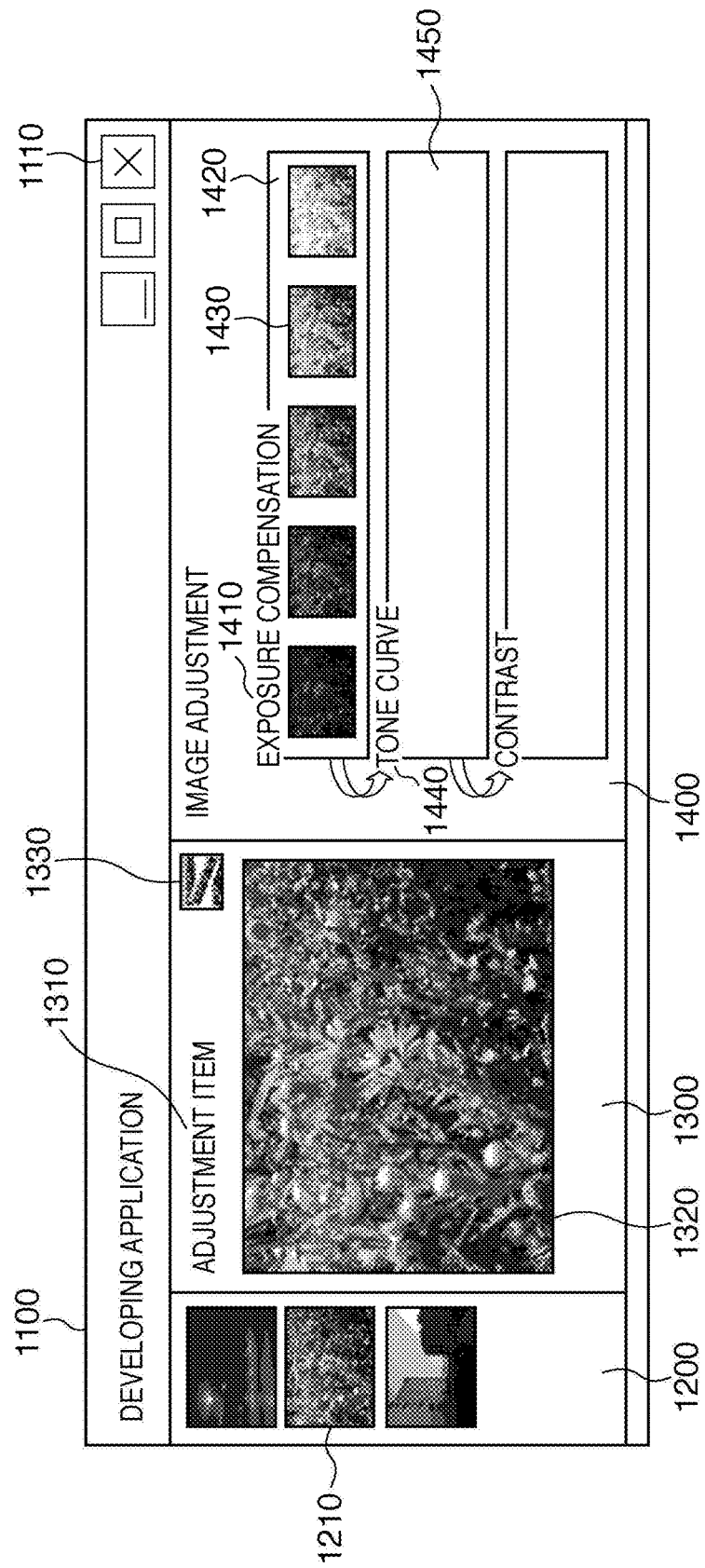
FIG. 6 is a view showing an example of a screen displayed by the image processing apparatus according to the present invention.

The image selection screen 1100 shown in FIG. 6 includes the program end button 1110, RAW image selection area 1200, image display area 1300, and adjustment item list display area 1400. Image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes a first adjustment item 1410, a thumbnail display area 1420 which displays a list of a plurality of thumbnails using a plurality of parameters of the adjustment item 1410 and allows the user to select a predetermined thumbnail, and thumbnails 1430 after image processing using respective parameters. Furthermore, the adjustment item list display area 1400 includes a second adjustment item 1440 and a thumbnail display area 1450 used to display thumbnails using a plurality of parameters of the adjustment item 1440.

If the user selects one of the thumbnails in the thumbnail display area by clicking during an input waiting period after the UI screen in FIG. 6 is displayed (YES in S210), the selected thumbnail is displayed in a selected state. Then, the variable "adjustment item ID" and "parameter value" associated with the selected thumbnail are acquired (S220 in FIG. 1B). The "parameter value" is set in a field "VALUE" associated with the acquired variable "adjustment item ID" in the parameter table in FIG. 4 (S225 in FIG. 1B). The contents in the fields "VALUE" corresponding to the incremented count values of the variable "adjustment item ID" in the parameter table in FIG. 4 are deleted (S230 in FIG. 1B). The contents in the fields "VALUE" as the "parameter values" from the adjustment item corresponding to the variable "adjustment item ID"="1" to that corresponding to the variable "adjustment item ID" in the parameter table in FIG. 4 acquired in S220 in FIG. 1B are acquired in turn, and image processing is applied to the target image data. The processed image that has undergone the image processing is displayed on the target image display area 1320 in FIG. 5 (S240), and the operable adjusted image store button 1330 is displayed. The variable "adjustment item ID" acquired in S220 in FIG. 1B is held (S250), and the adjustment item name corresponding to the variable "adjustment item ID" is displayed on the adjustment item name 1310. Furthermore, it is determined if the variable "adjustment item ID" indicates the last processing item. If the variable "adjustment item ID" does not indicate the last processing item (NO in S260 in FIG. 1B), the count of the variable "adjustment item ID" is incremented by 1 (S160 in FIG. 1A). In order to create a plurality of thumbnails corresponding to one adjustment item, the thumbnail creation program in FIG. 3 is executed (S170). The thumbnail creation program shown in FIG. 3 is as described above.

An example in which the user selects the second leftmost thumbnail displayed in the "exposure compensation" thumbnail display area 1420 of the first adjustment item 1410 in FIG. 6 will be described below. When the user clicks the second leftmost thumbnail of a plurality of thumbnails displayed on the "exposure compensation" thumbnail display area 1420 of the first adjustment item 1410, YES is determined in S210 in FIG. 1B. The clicked thumbnail is displayed in a selected state, and the variable "adjustment item ID"="1" and the "parameter value"="−3" associated with the selected thumbnail are acquired (S220 in FIG. 1B). The "parameter value"="−3" is set in a field "VALUE" associated with the acquired variable "adjustment item ID"="1" in the parameter table in FIG. 4 (S225 in FIG. 1B). The "parameter values" in the fields "VALUE" associated with the incremented count values "2" and "3" of the variable "adjustment item ID" in the parameter table in FIG. 4 are deleted (S230 in FIG. 1B). Then, the "parameter value"="−3" set in the variable "adjustment item ID"="1" in the parameter table in FIG. 4 is acquired, and image processing of "exposure compensation" as the variable "adjustment item ID"="1" is applied to the target image data using the "parameter value"="−3". In this example, since the selected thumbnail corresponds to the first adjustment item, the image processing ends, the processed image is displayed on the target image display area 1320 in FIG. 6 (S240), and the operable adjusted image store button 1330 is displayed. Next, the variable "adjustment item ID" used to acquire an adjustment item is set to be "1" acquired in S220 (S250), and the count value of the variable "adjustment item ID" is incremented by 1 (S160). In order to create a plurality of thumbnails of the adjustment item "tone curve" corresponding to the variable "adjustment item ID"="2", the thumbnail creation program in FIG. 3 is executed (S170). In FIG. 3, five parameters "0:0", "80:128", "128:128", "128:200", and "255:255" corresponding to the variable "adjustment item ID"="2" are acquired from the parameter table in FIG. 4 (S300). The "tone curve" image processing requires two values, i.e., input and output values. In this embodiment, these values are held in the parameter table in FIG. 4 by delimiting them by ":". Image processing of the adjustment item "tone curve" corresponding to the variable "adjustment item ID"="2" (S330) and thumbnail creation processing (S340) are repetitively executed for the "image data" created in S240 in FIG. 1B using the five parameter values. After creation of the thumbnails using the five processing parameters (NO in S360), the processing in FIG. 3 ends, and the process returns to S170 in FIG. 1A. The five thumbnails created by the processing in FIG. 3 are displayed on the "tone curve" thumbnail display area corresponding to the variable "adjustment item ID"="2" (S180). It is then determined if thumbnails are displayed on a field of the adjustment item "contrast" corresponding to the incremented count value "3" or more of the variable "adjustment item ID". Since no such thumbnails are displayed on the screen in FIG. 6 (NO in S190), the control waits for a user's input operation. At this time, the UI screen has a state immediately after the adjustment target image is selected, as shown in FIG. 7.

Figure 7:
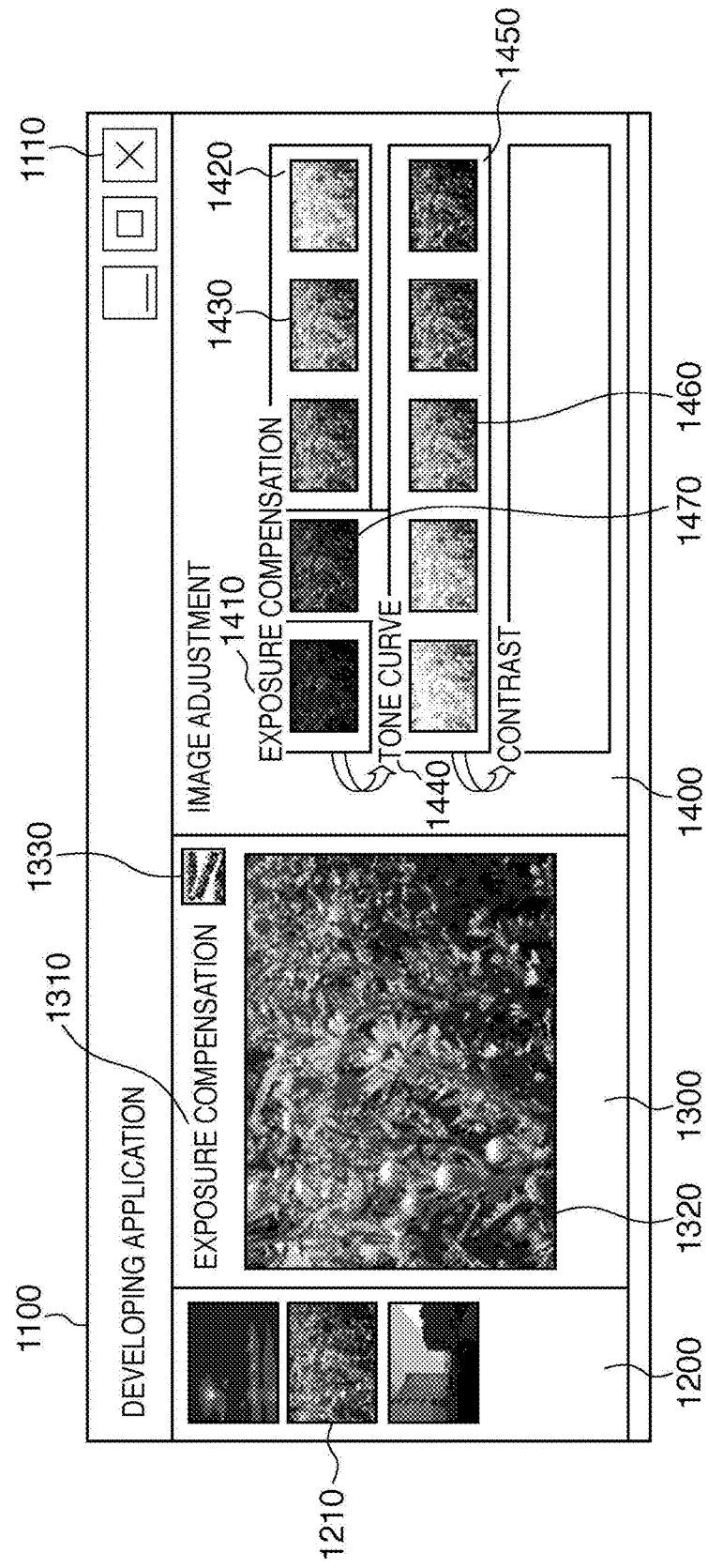
FIG. 7 is a view showing an example of a screen displayed by the image processing apparatus according to the present invention.

The image selection screen 1100 shown in FIG. 7 includes the program end button 1110, RAW image selection area 1200, image display area 1300, and adjustment item list display area 1400. The image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes the first adjustment item "exposure compensation" 1410, the thumbnail display area 1420 of thumbnails using the plurality of parameters of the adjustment item 1410, and thumbnails 1430 after the image processing using the respective parameters. Also, the adjustment item list display area 1400 includes a decided parameter thumbnail 1470 of the first adjustment item "exposure compensation" 1410 decided by a user's operation. Furthermore, the adjustment item list display area 1400 includes the second adjustment item "tone curve" 1440, the thumbnail display area 1450 of thumbnails using a plurality of parameters of the adjustment item 1440, and thumbnails 1460 based on the plurality of parameters of the adjustment item 1440.

If the user selects one of the thumbnails in the thumbnail display area by clicking during an input waiting period after the UI screen in FIG. 7 is displayed (YES in S210), the thumbnail already set in the selected state is deselected. Then, the newly selected thumbnail is set in a selected state. Since the subsequent operations are the same as those executed when the user selects one of the thumbnails in the thumbnail display area during an input waiting period after the UI screen in FIG. 6 is displayed, a repetitive description thereof will be avoided.

An example in which the user selects the fourth leftmost thumbnail while the second leftmost thumbnail displayed in the "exposure compensation" thumbnail display area 1420 of the first adjustment item 1410 is set in the selected state in FIG. 7 will be described below. If the user clicks the fourth leftmost thumbnail while the second leftmost thumbnail in the "exposure compensation" thumbnail display area 1420 of the first adjustment item 1410 is selected, YES is determined in S210 in FIG. 1B. At this time, the selected state of the second leftmost thumbnail of the first adjustment item 1410 "exposure compensation" is canceled. Then, the clicked thumbnail is set in a selected state, and the variable "adjustment item ID"="1" and "parameter value"="+3" associated with the selected thumbnail are acquired (S220 in FIG. 1B). The "parameter value"="+3" is set in the field "VALUE" associated with the acquired variable "adjustment item ID"="1" in the parameter table in FIG. 4 (S225 in FIG. 1B). The "parameter values" in the fields "VALUE" associated with the incremented count values "2" and "3" of the variable "adjustment item ID" in the parameter table in FIG. 4 are deleted (S230 in FIG. 1B). Then, the "parameter value"="+3" set in the variable "adjustment item ID"="1" in the parameter table in FIG. 4 is acquired, and image processing of "exposure compensation" as the variable "adjustment item ID"="1" is applied to the target image data using the "parameter value"="+3". In this example, since the selected thumbnail corresponds to the first adjustment item, the image processing ends, the processed image is displayed on the target image display area 1320 in FIG. 7 (S240), and the operable adjusted image store button 1330 is displayed. Next, the variable "adjustment item ID" used to acquire an adjustment item is set to be "1" acquired in S220 (S250), and the count value of the variable "adjustment item ID" is incremented by 1 (S160). In order to create a plurality of thumbnails of the adjustment item "tone curve" corresponding to the variable "adjustment item ID"="2", the thumbnail creation program in FIG. 3 is executed (S170). In FIG. 3, five parameters "0:0", "80:128", "128:128", "128:200", and "255:255" corresponding to the variable "adjustment item ID"="2" are acquired from the parameter table in FIG. 4 (S300). Image processing of the adjustment item "tone curve" corresponding to the variable "adjustment item ID"="2" (S330) and thumbnail creation processing (S340) are repetitively executed for the "image data" created in S240 in FIG. 1B using the five parameter values. After creation of the thumbnails using the five parameters (NO in S360), the processing in FIG. 3 ends, and the process returns to S170 in FIG. 1A. The five thumbnails created by the processing in FIG. 3 are displayed on the "tone curve" thumbnail display area corresponding to the variable "adjustment item ID"="2" (S180). It is then determined if thumbnails are displayed on a field of the adjustment item "contrast" corresponding to the incremented count value "3" or more of the variable "adjustment item ID". Since no such thumbnails are displayed on the screen in FIG. 7 (NO in S190), the control waits for a user's input operation. At this time, the UI screen has a state immediately after the adjustment target image is selected, as shown in FIG. 8.

Figure 8:
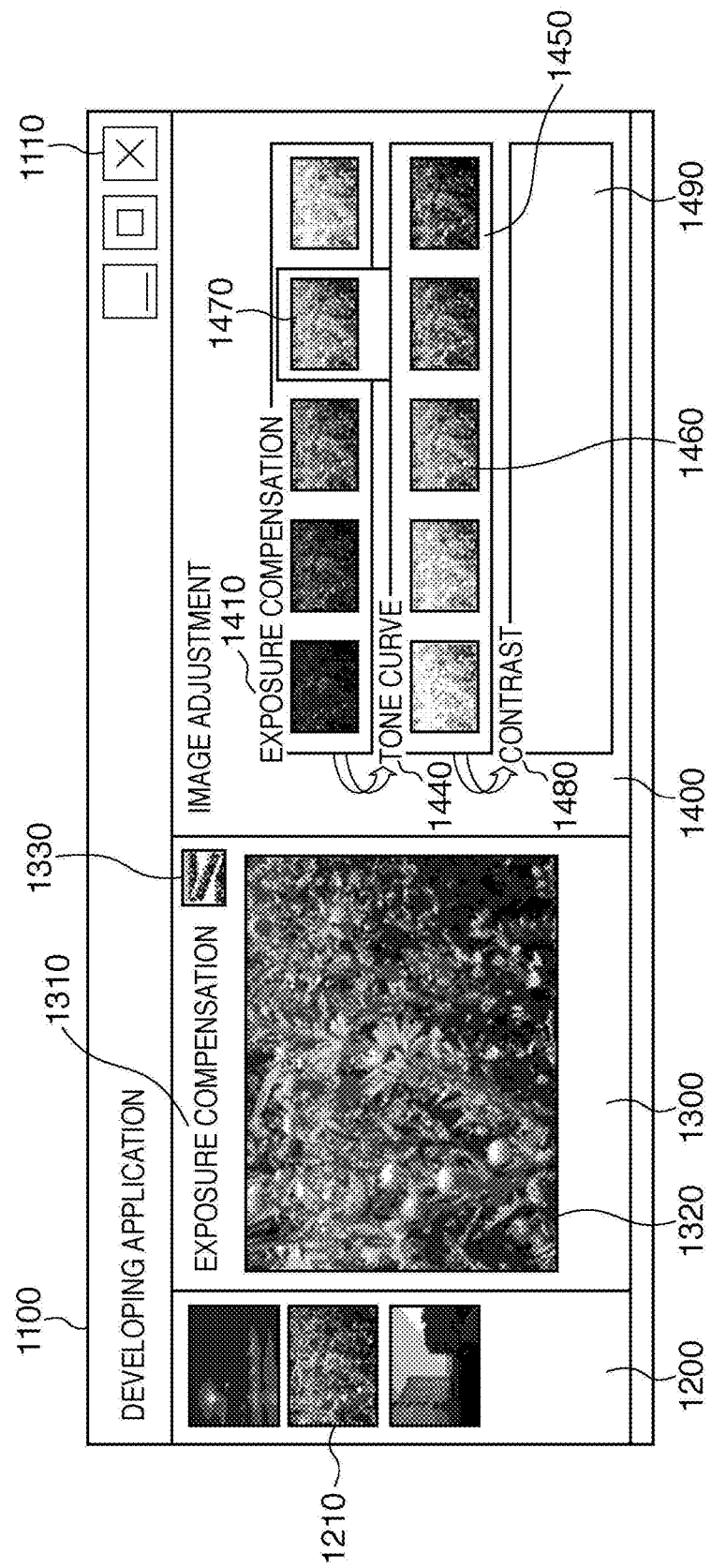
FIG. 8 is a view showing an example of a screen displayed by the image processing apparatus according to the present invention.

The image selection screen 1100 shown in FIG. 8 includes the program end button 1110, RAW image selection area 1200, image display area 1300, and adjustment item list display area 1400. The image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes the first adjustment item "exposure compensation" 1410, and the decided parameter thumbnail 1470 of the first adjustment item "exposure compensation" 1410 decided by a user's operation. Also, the adjustment item list display area 1400 includes the second adjustment item "tone curve"

1440, the thumbnail display area 1450 of thumbnails using a plurality of parameters of the adjustment item 1440, and the thumbnails 1460 based on the plurality of parameters of the adjustment item 1440. Furthermore, the adjustment item list display area 1400 includes a third adjustment item "contrast" 1480, a thumbnail display area 1490 of thumbnails using a plurality of parameters of the adjustment item 1480, and thumbnails 1460 based on the plurality of parameters of the adjustment item 1480.

If the user selects one of the thumbnails in the thumbnail display area 1440 by clicking during an input waiting period after the UI screen in FIG. 8 is displayed (YES in S210), the thumbnail already set in the selected state is deselected. Then, the selected thumbnail is set in a selected state. Since the subsequent operations are the same as those executed when the user selects one of the thumbnails in the thumbnail display area during an input waiting period after the screen in FIG. 6 is displayed, a repetitive description thereof will be avoided.

An example in which the user clicks the third leftmost thumbnail of the second adjustment item 1440 "tone curve" while the fourth leftmost thumbnail of the first adjustment item 1410 "exposure compensation" is set in the selected state in FIG. 8 will be described below. If the user clicks the third leftmost thumbnail of the "tone curve" thumbnail display area 1450 of the second adjustment item 1440, YES is determined in S210 in FIG. 1B. At this time, the selected state of the fourth leftmost thumbnail of the first adjustment item 1410 "exposure compensation" is canceled.

Then, the clicked thumbnail is set in a selected state, and the variable "adjustment item ID"="2" and "parameter value"="128:128" associated with the selected thumbnail are acquired (S220 in FIG. 1B). The "parameter value"="128:128" is set in the field "VALUE" associated with the acquired variable "adjustment item ID"="2" in the parameter table in FIG. 4 (S225 in FIG. 1B). The "parameter value" in the field "VALUE" associated with the incremented count value "3" of the variable "adjustment item ID" in the parameter table in FIG. 4 is deleted (S230 in FIG. 1B). Next, the "parameter value"="+3" set in the variable "adjustment item ID"="1" in the parameter table in FIG. 4 is acquired, and image processing of "exposure compensation" as the variable "adjustment item ID"="1" is applied to the target image data using the "parameter value"="+3". Then, the "parameter value"="128:128" set in the variable "adjustment item ID"="2" in the parameter table in FIG. 4 is acquired, and image processing of "tone curve" as the variable "adjustment item ID"="2" is applied to this image data using the "parameter value"="128:128". In this example, since the variable "adjustment item ID" acquired in S220 in FIG. 1B is "2", the image processing ends, the processed image is displayed on the target image display area 1320 in FIG. 8 (S240), and the operable adjusted image store button 1330 is displayed. Next, the variable "adjustment item ID" used to acquire an adjustment item is set to be "2" acquired in S220 (S250), and the count value of the variable "adjustment item ID" is incremented by 1 (S160). In order to create a plurality of thumbnails of the adjustment item "contrast" corresponding to the variable "adjustment item ID"="3", the thumbnail creation program in FIG. 3 is executed (S170). In FIG. 3, five parameters "1", "2", "3", "4", and "5" corresponding to the variable "adjustment item ID"="3" are acquired from the parameter table in FIG. 4 (S300). Image processing of the adjustment item "contrast" corresponding to the variable "adjustment item ID"="3" (S330) and thumbnail creation processing (S340) are repetitively executed for the "image data" created in S240 in FIG. 1B using the five parameter values. After creation of the thumbnails using the five parameters (NO in S360), the processing in FIG. 3 ends, and the process returns to S170 in FIG. 1A. The five thumbnails created by the processing in FIG. 3 are displayed on the "contrast" thumbnail display area corresponding to the variable "adjustment item ID"="3" (S180). It is then determined if thumbnails are displayed on a field of the adjustment item corresponding to the incremented count value "4" or more of the variable "adjustment item ID". However, since "contrast" is the last adjustment item, NO is determined in S190 in FIG. 1A, and the control waits for a user's input operation. At this time, the UI screen has a state immediately after the adjustment target image is selected, as shown in FIG. 9.

Figure 9:
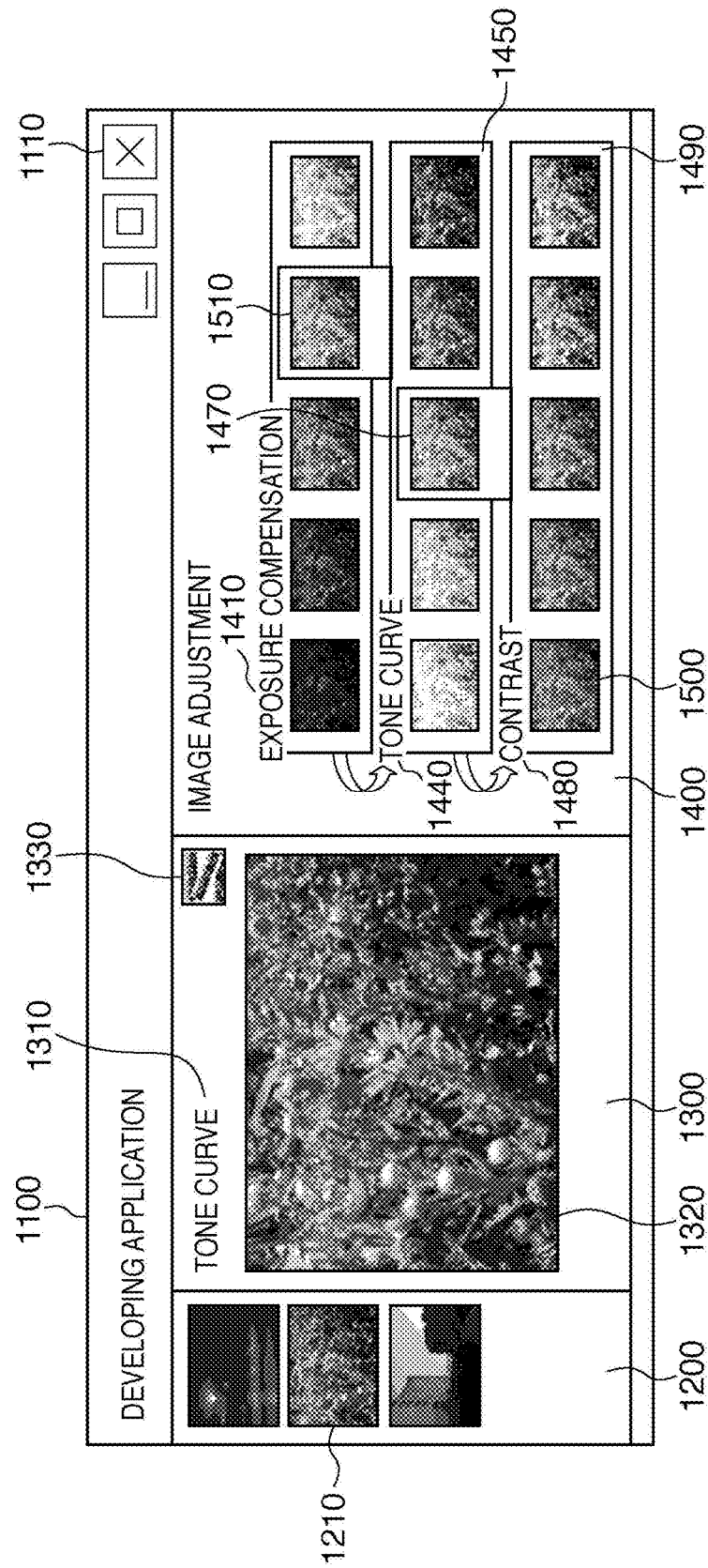
FIG. 9 is a view showing an example of a screen displayed by the image processing apparatus according to the present invention.

The image selection screen 1100 shown in FIG. 9 includes the program end button 1110, RAW image selection area 1200, image display area 1300, and adjustment item list display area 1400. The image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes the first adjustment item "exposure compensation" 1410, and a decided parameter thumbnail 1510 of the first adjustment item "exposure compensation" 1410 decided by a user's operation. Also, the adjustment item list display area 1400 includes the second adjustment item "tone curve" 1440, the thumbnail display area 1450 of thumbnails using a plurality of parameters of the adjustment item 1440, and a currently selected thumbnail 1470 based on a decided parameter of the adjustment item 1440. Furthermore, the adjustment item list display area 1400 includes the third adjustment item "contrast" 1480, the thumbnail display area 1490 of thumbnails using a plurality of parameters of the adjustment item 1480, and thumbnails 1500 based on the plurality of parameters of the adjustment item 1480.

If the user selects one of the thumbnails in the thumbnail display area 1480 by clicking during an input waiting period after the screen in FIG. 9 is displayed (YES in S210), the thumbnail currently set in the selected state is deselected. Then, the newly selected thumbnail is set in a selected state. Then, the variable "adjustment item ID" and "parameter value" associated with the selected thumbnail are acquired (S220 in FIG. 1B). The "parameter value" is set in the field "VALUE" associated with the acquired variable "adjustment item ID" in the parameter table in FIG. 4 (S225 in FIG. 1B). The contents in the fields "VALUE" as the "parameter values" from the adjustment item corresponding to the variable "adjustment item ID"="1" in the parameter table in FIG. 4 to that corresponding to the variable "adjustment item ID" acquired in S220 in FIG. 1B are acquired in turn, and image processing is applied to the target image data. The processed image that has undergone the image processing is displayed on the target image display area 1320 in FIG. 9 (S240), and the operable adjusted image store button 1330 is displayed. The variable "adjustment item ID" acquired in S220 in FIG. 1B is held (S250), and the adjustment item name corresponding to the variable "adjustment item ID" is displayed on the adjustment item name 1310. Furthermore, it is determined if the variable "adjustment item ID" indicates the last processing item. If the variable "adjustment item ID" indicates the last processing item (YES in S260 in FIG. 1B), the control waits for a user's input operation.

An example in which the user clicks the leftmost thumbnail of the third adjustment item 1480 "contrast" while the third leftmost thumbnail of the second adjustment item 1440 "tone curve" is set in the selected state in FIG. 9 will be described below. If the user clicks the leftmost thumbnail of the "contrast" thumbnail display area 1490 of the third adjustment item 1480, YES is determined in S210 in FIG. 1B. At this time, the selected state of the third leftmost thumbnail of the second adjustment item 1440 "tone curve" is canceled. Then, the clicked thumbnail is set in a selected state, and the variable "adjustment item ID"="3" and "parameter value"="1" associated with the selected thumbnail are acquired (S220 in FIG. 1B). The "parameter value"="1" is set in a field "VALUE" associated with the acquired variable "adjustment item ID"="3" in the parameter table in FIG. 4 (S225 in FIG. 1B). In this example, since there is no field "VALUE" associated with the incremented count value of the variable "adjustment item ID" in the parameter table in FIG. 4, "parameter value" deletion is skipped, and the process advances to step S240. The "parameter value"="+3" set in the variable "adjustment item ID"="1" in the parameter table in FIG. 4 is acquired, and image processing of "exposure compensation" as the variable "adjustment item ID"="1" is applied to the target image data using the "parameter value"="+3". Then, the "parameter value"="128:128" set in the variable "adjustment item ID"="2" in the parameter table in FIG. 4 is acquired, and image processing of "tone curve" as the variable "adjustment item ID"="2" is applied to this image data using the "parameter value"="128:128". Furthermore, the "parameter value"="1" set in the variable "adjustment item ID"="3" in the parameter table in FIG. 4 is acquired, and image processing of "contrast" as the variable "adjustment item ID"="3" is applied to this image data using the "parameter value"="1". In this example, since the variable "adjustment item ID" acquired in S220 in FIG. 1B is "3", the image processing ends, the processed image is displayed on the target image display area 1320 in FIG. 9 (S240), and the operable adjusted image store button 1330 is displayed. Next, the variable "adjustment item ID" used to acquire an adjustment item is set to be "3" acquired in S220 (S250), and it is determined if the variable "adjustment item ID" is that of the last item. Since the variable "adjustment item ID"="3" in the parameter table in FIG. 4 indicates the last adjustment item, NO is determined in S190 in FIG. 1A, and the control waits for a user's input operation. At this time, the UI screen has a state immediately after the adjustment target image is selected, as shown in FIG. 10.

Figure 10:
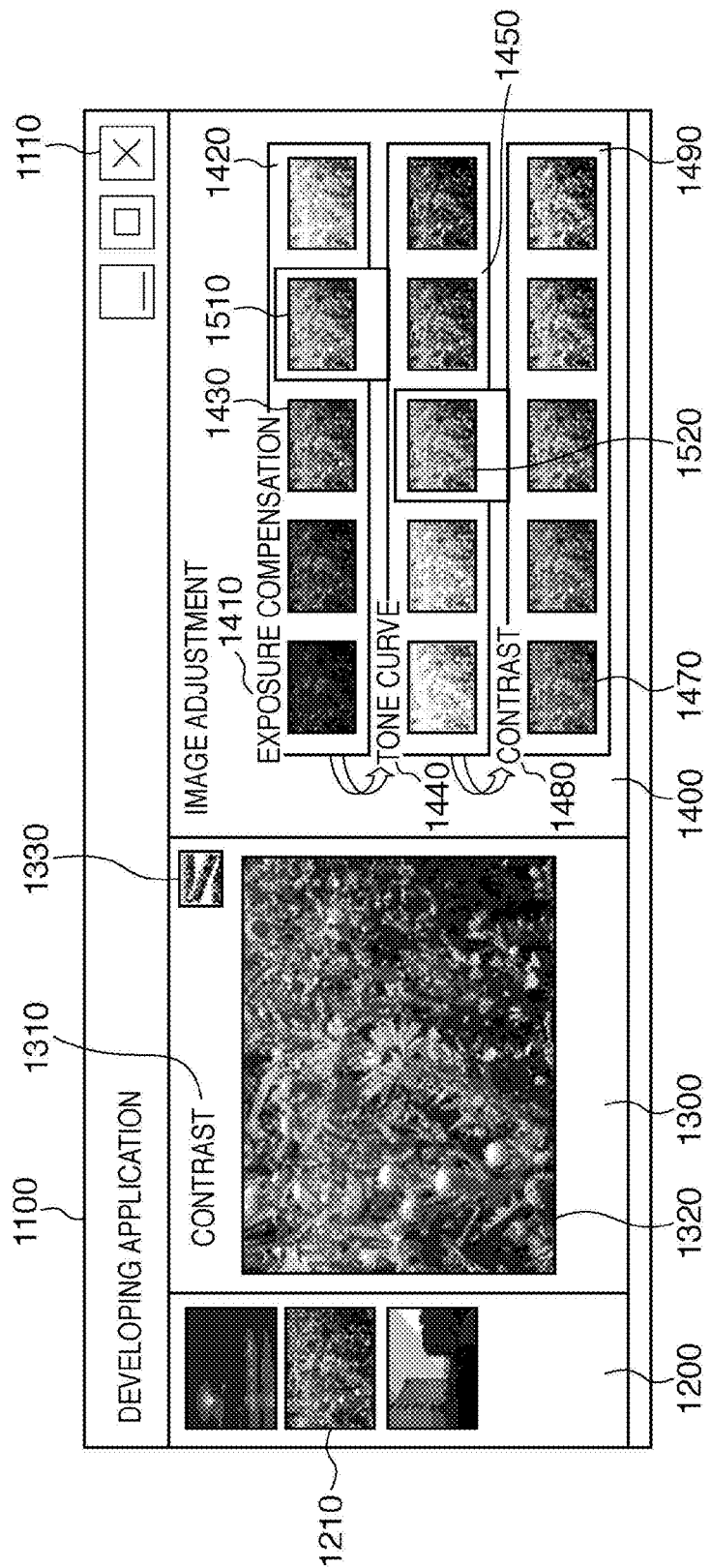
FIG. 10 is a view showing an example of a screen displayed by the image processing apparatus according to the present invention.

The image selection screen 1100 shown in FIG. 10 includes the program end button 1110, RAW image selection area 1200, image display area 1300, and adjustment item list display area 1400. The image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes the first adjustment item "exposure compensation" 1410, and the decided parameter thumbnail 1510 of the first adjustment item "exposure compensation" 1410 decided by a user's operation. Also, the adjustment item list display area 1400 includes the second adjustment item "tone curve" 1440, the thumbnail display area 1450 of thumbnails using a plurality of parameters of the adjustment item 1440, and a decided parameter thumbnail 1520 of the adjustment item "tone curve" 1440 decided by a user's operation. Furthermore, the adjustment item list display area 1400 includes the third adjustment item "contrast" 1480, the thumbnail display area 1490 of thumbnails using a plurality of parameters of the adjustment item 1480, and a currently selected thumbnail 1470 based on the decided parameter of the adjustment item 1480.

Figure 12:
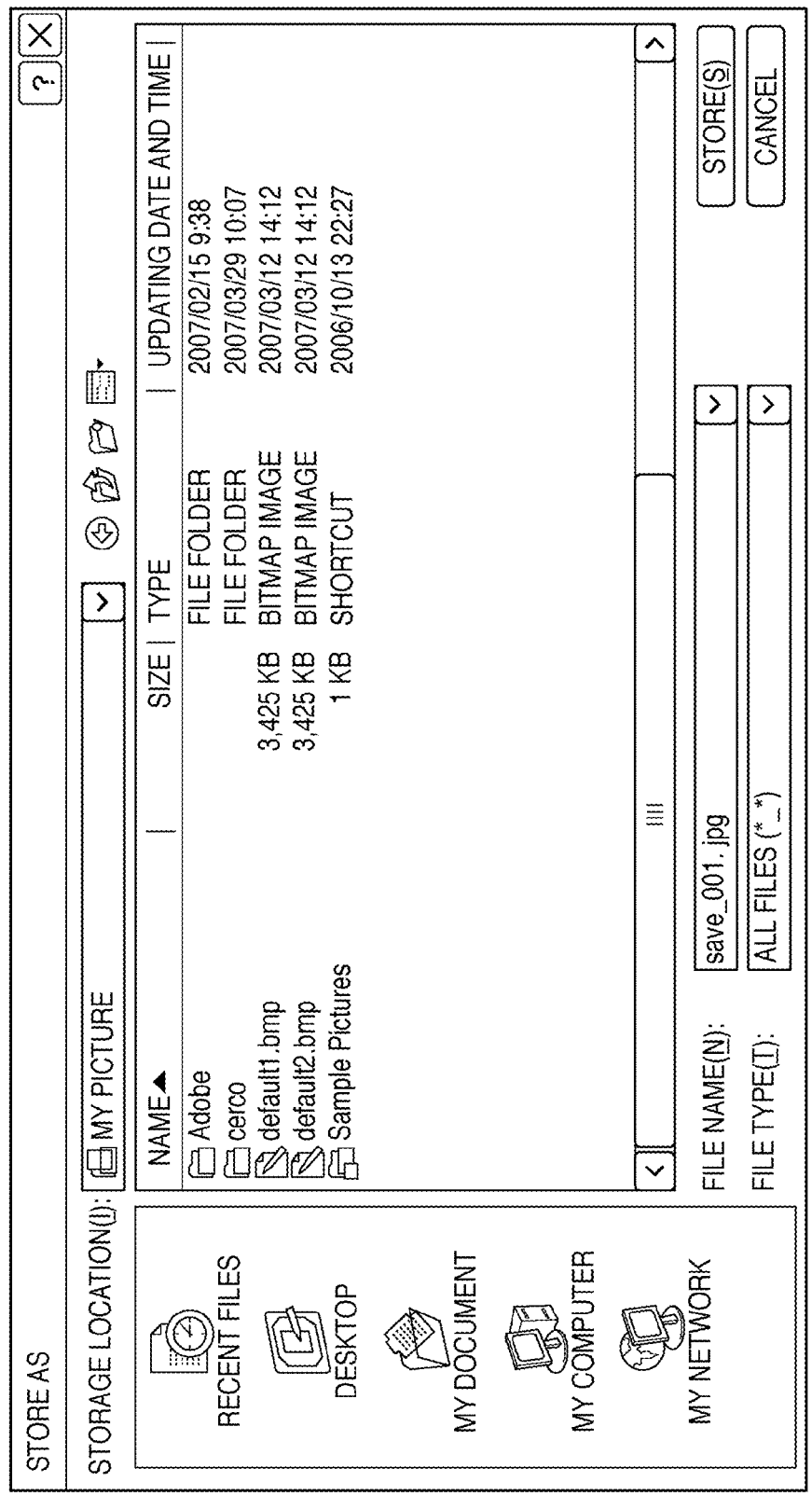
FIG. 12 is a view showing an example of a screen displayed by the image processing apparatus according to the present invention.

If the user clicks the adjusted image store button 1330 during an input waiting period after the screen in FIG. 10 is displayed (YES in S270), an output file path designation screen in FIG. 12 which prompts the user to designate a file path to be stored is displayed. After the user inputs a file name, image processing is applied using the parameter values set in the respective adjustment items, and the processed image data is output in a JPEG file format (S280). The "parameter values" set in the variables "adjustment item ID" in the parameter table in FIG. 4 are acquired, and the image processing is applied to the target image data using the acquired "parameter values" in the order of the variables "adjustment item ID". After the image processing is applied for all the adjustment items set in the parameter table in FIG. 4, the image processing result is stored in the JPEG format in the file path designated by the user, and the control then waits for a user's input operation. If the user clicks the end button 1110 during this input waiting period (YES in S290), this image processing program ends.

An example in which the user clicks the adjusted image store button 1330 in FIG. 10 will be described below. If the user clicks the adjusted image store button 1330 (YES in S270), the storage file path designation screen in FIG. 12, which prompts the user to designate a file path to be stored is displayed. After the user sets the file path, the contents in the fields "VALUE" as the "parameter values" corresponding to the variables "adjustment item ID" set in the parameter table in FIG. 4 are acquired in turn. In FIG. 10, the "parameter value"="+3" set in the variable "adjustment item ID"="1" is acquired first. Then, the image processing of the adjustment item "exposure compensation" associated with the variable "adjustment item ID"="1" is applied to the target image data using the "parameter value"="+3". Next, the "parameter value"="128:128" set in the variable "adjustment item ID"="2" is acquired. Then, the image processing of the adjustment item "tone curve" associated with the variable "adjustment item ID"="2" is applied to the image data that has undergone the "exposure compensation" processing using the "parameter value"="128:128". Furthermore, the "parameter value"="1" set in the variable "adjustment item ID"="3" is acquired. Then, the image processing of the adjustment item "contrast" associated with the variable "adjustment item ID"="3" is applied to the image data that has undergone the "exposure compensation" and "tone curve" processes using the "parameter value"="1". The image processing result is stored in the JPEG format in the file path designated by the user, and the control waits for a user's input operation.

On the other hand, if the user selects an arbitrary thumbnail in the thumbnail display area by clicking during an input waiting period after the screen in FIG. 10 is displayed (YES in S210), the thumbnail already set in the selected state is deselected. Then, the selected thumbnail is set in a selected state. Next, the variable "adjustment item ID" and "parameter value" associated with the selected thumbnail are acquired (S220 in FIG. 1B). The "parameter value" is set in a field "VALUE" associated with the acquired variable "adjustment item ID" in the parameter table in FIG. 4 (S225 in FIG. 1B). The contents in the fields "VALUE" corresponding to the incremented count values of the variable "adjustment item ID" in the parameter table in FIG. 4 are deleted (S230 in FIG. 1B). The contents in the fields "VALUE" as "parameter values" from the adjustment item corresponding to the variable "adjustment item ID"="1" in the parameter table in FIG. 4 to that corresponding to the variable "adjustment item ID" acquired in S220 in FIG. 1B are acquired in turn, and image processing is applied to the target image data. The processed image that has undergone the image processing is displayed on the target image display area 1320 in FIG. 10 (S240), and the operable adjusted image store button 1330 is displayed. The variable "adjustment item ID" acquired in S220 in FIG. 1B is held (S250), and the adjustment item name corresponding to the variable "adjustment item ID" is displayed on the adjustment item name 1310. Furthermore, it is determined if the variable "adjustment item ID" indicates the last processing item. If the variable "adjustment item ID" does not indicate the last processing item (NO in S260 in FIG. 1B), the count of the variable "adjustment item ID" is incremented by 1 (S160 in FIG. 1A). In order to create a plurality of thumbnails corresponding to one adjustment item, the thumbnail creation program in FIG. 3 is executed (S170). Since the thumbnail creation program shown in FIG. 3 is as described above, a repetitive description thereof will be avoided. After completion of the thumbnail creation program in FIG. 3, the process advances to S180 in FIG. 1A. In S180 in FIG. 1A, the plurality of thumbnails created by the processing in FIG. 3 are displayed on the thumbnail display area of the adjustment item corresponding to the variable "adjustment item ID" (S180). It is then determined if thumbnails are displayed on fields of the adjustment items corresponding to the incremented count values of the variable "adjustment item ID". If thumbnails are displayed on fields of the adjustment items corresponding to the incremented count values of the variable "adjustment item ID" (YES in S190 in FIG. 1A), all the plurality of thumbnails are deleted (S200 in FIG. 1A).

An example in which the user clicks the third leftmost thumbnail of the first adjustment item 1410 "exposure compensation" while the thumbnail displayed in the thumbnail display area 1490 of the third adjustment item 1480 "contrast" is set in the selected state in FIG. 10 will be described below. If the user clicks the thumbnail of the first adjustment item 1410 "exposure compensation" in FIG. 10, YES is determined in S210 in FIG. 1A. The selected state of the thumbnail of the third adjustment item 1480 "contrast" is canceled, and the clicked thumbnail is set in a selected state. Then, the variable "adjustment item ID"="1" and the "parameter value"="0" associated with the selected thumbnail are acquired (S220 in FIG. 1B). The "parameter value"="0" is set in the field "VALUE" associated with the acquired variable "adjustment item ID"="1" in the parameter table in FIG. 4 (S225 in FIG. 1B). The "parameter values" in the fields "VALUE" associated with the incremented count values "2" and "3" of the variable "adjustment item ID" in the parameter table in FIG. 4 are deleted (S230 in FIG. 1B). Then, the "parameter value"="0" set in the variable "adjustment item ID"="1" in the parameter table in FIG. 4 is acquired, and image processing of "exposure compensation" as the variable "adjustment item ID"="1" is applied to the target image data using the "parameter value"="0". In this example, since the selected thumbnail corresponds to the first adjustment item, the image processing ends, the processed image is displayed on the target image display area 1320 in FIG. 10 (S240), and the operable adjusted image store button 1330 is displayed. Next, the variable "adjustment item ID" used to acquire an adjustment item is set to be "1" acquired in S220 (S250), and the count value of the variable "adjustment item ID" is incremented by 1 (S160 in FIG. 1A). In order to create a plurality of thumbnails of the adjustment item "tone curve" corresponding to the variable "adjustment item ID"="2", the thumbnail creation program in FIG. 3 is executed (S170 in FIG. 1A). In FIG. 3, five parameters "0:0", "80:128", "128:

128", "128:200", and "255:255" corresponding to the variable "adjustment item ID"="2" are acquired from the parameter table in FIG. 4 (S300 in FIG. 3). Then, image processing of the adjustment item "tone curve" corresponding to the variable "adjustment item ID"="2" (S330) and thumbnail creation processing (S340) are repetitively executed for the image data created in S240 in FIG. 1B using the five parameter values. After creation of the thumbnails using the five parameters (NO in S360), the processing in FIG. 3 ends, and the process returns to S170 in FIG. 1A. The five thumbnails created by the processing in FIG. 3 are displayed on the "tone curve" thumbnail display area corresponding to the variable "adjustment item ID"="2" (S180). It is then determined if thumbnails are displayed on a field of the adjustment item "contrast" corresponding to the incremented count value "3" or more of the variable "adjustment item ID". Since thumbnails are displayed on the "contrast" field in FIG. 10 (YES in S190), all the thumbnails displayed on the "contrast" field are deleted (S200). At this time, the UI screen has a state immediately after the adjustment target image is selected, as shown in FIG. 11.

Figure 11:
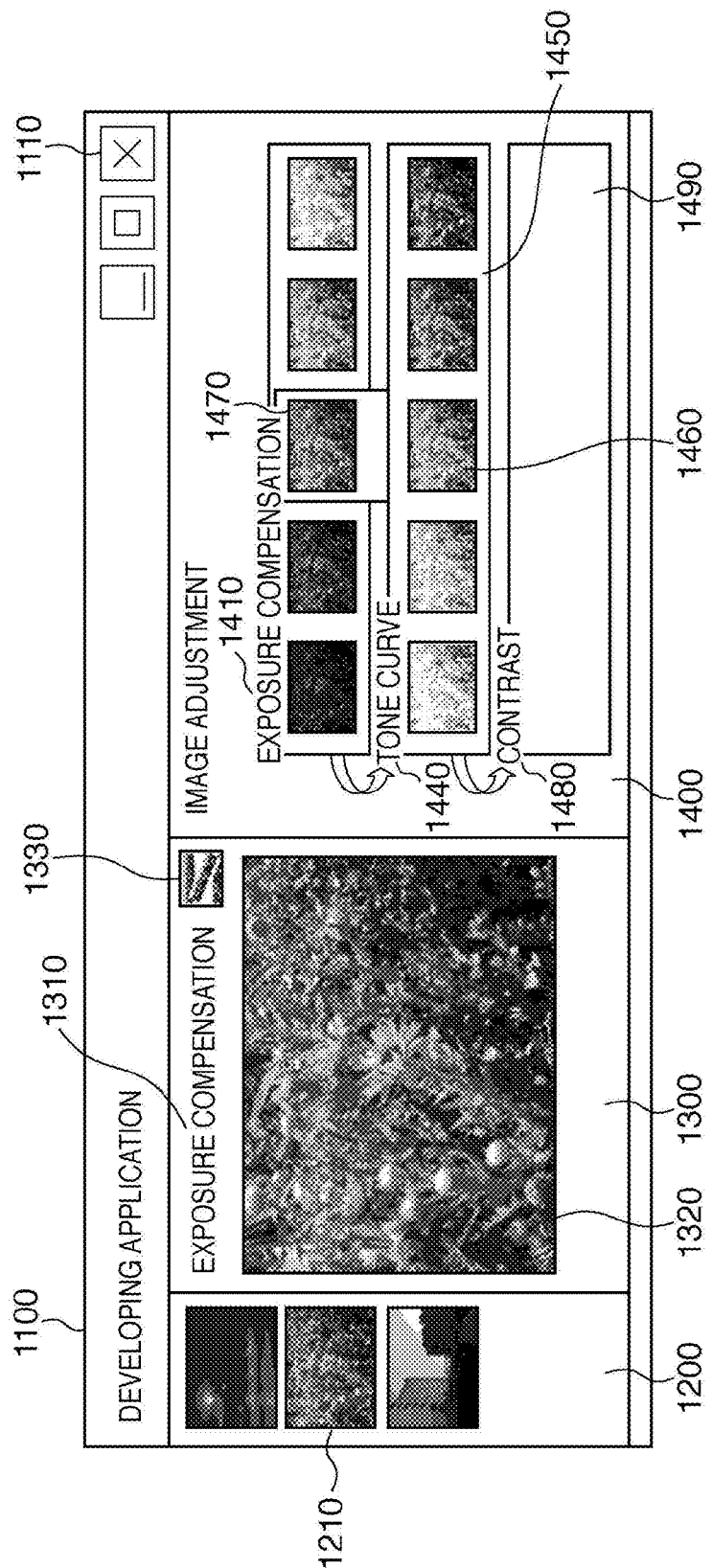
FIG. 11 is a view showing an example of a screen displayed by the image processing apparatus according to the present invention.

The image selection screen 1100 shown in FIG. 11 includes the program end button 1110, RAW image selection area 1200, image display area 1300, and adjustment item list display area 1400. The image data 1210 in the RAW image selection area 1200 is image data in the RAW image format, which serves as an image processing target. The image display area 1300 displays the currently processed image data. This image display area 1300 includes the currently adjusted item name 1310, target image display area 1320, and adjusted image store button 1330. The adjustment item list display area 1400 includes the first adjustment item "exposure compensation" 1410, and the decided parameter thumbnail 1470 of the first adjustment item "exposure compensation" 1410 decided by a user's operation. Also, the adjustment item list display area 1400 includes the second adjustment item "tone curve" 1440, the thumbnail display area 1450 of thumbnails using a plurality of parameters of the adjustment item 1440, and the thumbnails 1460 based on the plurality of parameters of the adjustment item 1440. Furthermore, the adjustment item list display area 1400 includes the third adjustment item "contrast" 1480, and the thumbnail display area 1490 of thumbnails using a plurality of parameters of the adjustment item 1480.

As described above, according to this embodiment, when image processing is applied to a plurality of adjustment items, the execution order of setting processes of the adjustment items is determined, and the adjustment items are displayed based on the order of the setting processes. The processing result based on a parameter set by a user's operation and those based on a plurality of parameters of the next adjustment item are displayed as a list of thumbnails. The user can advance the image adjustment by repetitively selecting a thumbnail of the adjustment item while confirming the processing results of the next adjustment item based on the parameter of the current adjustment item.

As a result, the processing can be guided to desired image data even for a beginner without any confusion in the setting processing sequence of a plurality of adjustment items.

Second Embodiment

The second embodiment will exemplify a case in which occurrence of color saturations such as a highlight saturation and shadow saturation can be detected from image data that has undergone image processing, in addition to the functions of the first embodiment. When a color saturation has occurred, the user is notified of it.

Since the arrangement of the image processing apparatus of this embodiment is the same as that shown in FIG. 2, a repetitive description thereof will be avoided.

In this embodiment, the thumbnail creation processing in S170 in FIG. 1A is different from the first embodiment. Since the processes other than the thumbnail creation processing (S170) in FIG. 1A are the same as those in the first embodiment, a repetitive description thereof will be avoided.

Figure 13:
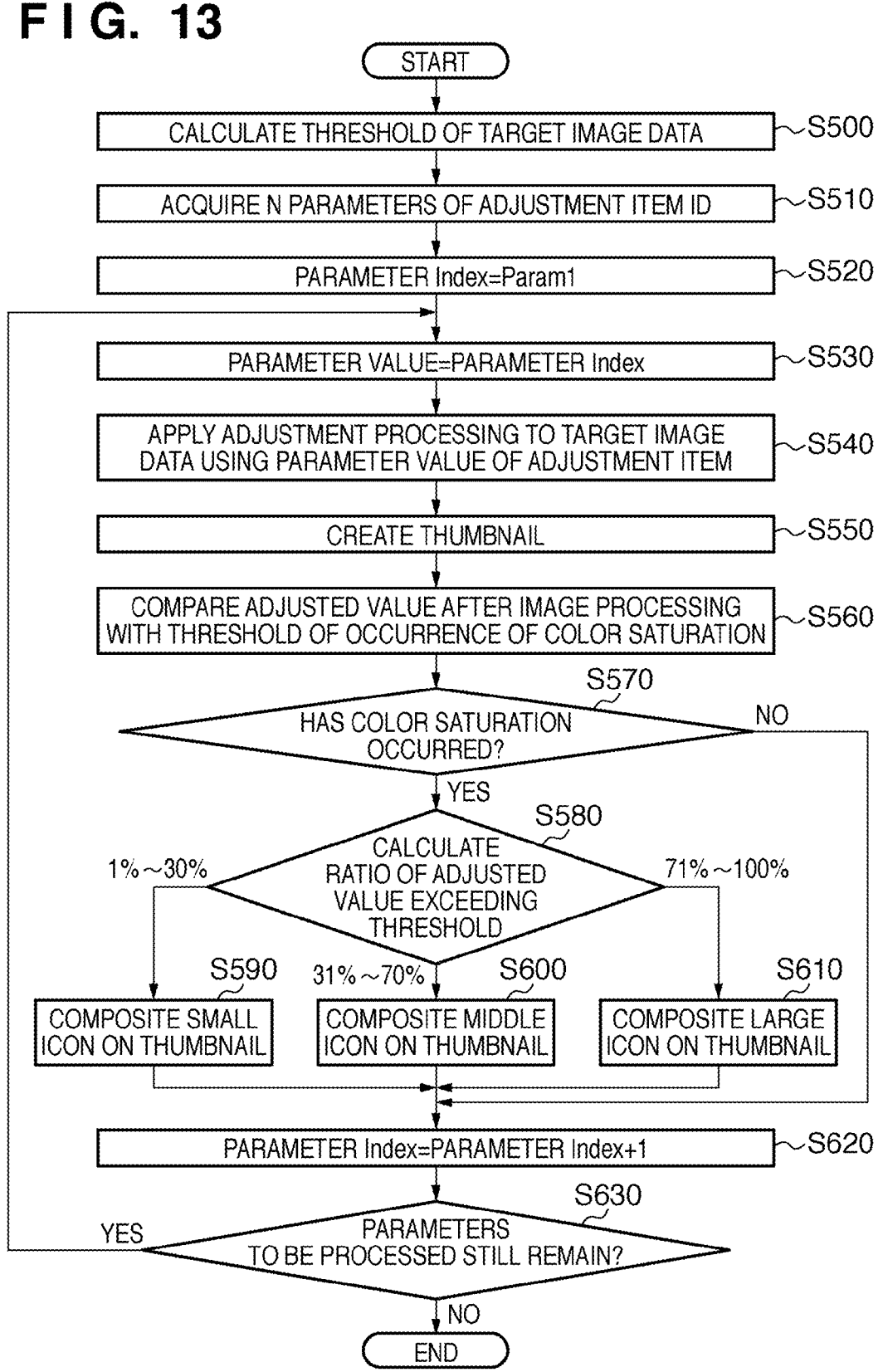
FIG. 13 is a flowchart showing an example of the operation sequence of the image processing apparatus according to the present invention.

FIG. 13 is a flowchart showing the sequence of thumbnail creation processing which is executed in S170 in FIG. 1A, and notifies the user of a color saturation.

Upon execution of FIG. 13, a sum total of black pixels "0" and white pixels "255" of target image data is calculated, and is set in a "threshold". A plurality of parameters for one adjustment item are acquired from the parameter table in FIG. 4 based on the variable "adjustment item ID" (S510). A value "parameter Index" used to acquire a parameter value is set to be "Param1" (S520), and a "parameter value" corresponding to the value "parameter Index" is acquired (S530). Image processing is applied to the target image data using the acquired "parameter value" (S540), and a thumbnail of the processed image is created (S550). A sum total of black pixels "0" and white pixels "255" is calculated from the image data after the image processing in S540, and is set in an "adjusted value". The calculated "threshold" and "adjusted value" are compared (S560). As a result of comparison between the "threshold" and "adjusted value", if these two values are equal to each other, it is determined that no color saturation occurs (NO in S570), and the control jumps to the next thumbnail creation processing (S620 in FIG. 13). On the other hand, as a result of comparison in S560, if the "adjusted value" is larger than the "threshold", it is determined that a color saturation occurs (YES in S570), and a ratio of occurrence of the color saturation is calculated (S580). A ratio of a value obtained by subtracting the "threshold" from the "adjusted value" to the entire target image data is calculated, and if the calculation result falls within a range from 1% to 30% (1% to 30% in S580), a small icon is composited to the thumbnail created in S550 (S590). If the calculation result falls within a range from 31% to 70% (31% to 70% in S580), a middle icon is composited to the thumbnail created in S550 (S600). If the calculation result falls within a range from 71% to 100% (71% to 100% in S580), a large icon is composited to the thumbnail created in S550 (S610). Upon completion of the thumbnail composition processing based on the ratio of occurrence of the color saturation, the process advances to the next thumbnail creation processing (S620). If the value "parameter Index" falls within a range from "Param1" to "Param5" (YES in S630), the processes in S530 to S620 are repeated. After respective thumbnails are created using all the parameters (NO in S630), the creation processing of a plurality of thumbnails in FIG. 13 ends, and the process advances to S180 in FIG. 1A. In S180 in FIG. 1A, the plurality of thumbnails created by the processing shown in FIG. 13 are displayed on a thumbnail display area of the adjustment item corresponding to the variable "adjustment item ID" (S180 in FIG. 1A).

In this embodiment, the sum total of black pixels "0" and white pixels "255" of target image data is calculated as the threshold considered as occurrence of a color saturation. However, the threshold may be held in advance. Also, the large, middle, or small icon is composited to the thumbnail so as to notify the user of the level of color saturation. Alternatively, a color saturation part may be changed in the thumbnail or the icon may be changed in correspondence with the level of saturation.

An example in which a color saturation has occurred when the user selects the fifth leftmost thumbnail displayed on the "exposure compensation" thumbnail display area 1420 of the first adjustment item 1410 in FIG. 6 will be described below. When the user clicks the fifth leftmost thumbnail of a plurality of thumbnails displayed on the "exposure compensation" thumbnail display area 1420 of the first adjustment item 1410, YES is determined in S210 in FIG. 1B. Since the processes from S210 to S160 in FIGS. 1A and 1B are the same as those in the first embodiment, a repetitive description thereof will be avoided.

In S170 in FIG. 1A, the thumbnail creation program in FIG. 13 is executed to create a plurality of thumbnails of the adjustment item "tone curve" corresponding to the variable "adjustment item ID"="2". In FIG. 13, the sum total of black pixels "0" and white pixels "255" of target image data is calculated, and is set in the "threshold" (S500). Assume that the "threshold" is "20" in this example. Five parameters "0:0", "80:128", "128:128", "128:200", and "255:255" corresponding to the variable "adjustment item ID"="2" are acquired from the parameter table in FIG. 4 (S510). The "tone curve" image processing requires two values, i.e., input and output values. In this embodiment, these values are held in the parameter table in FIG. 4 by delimiting them by ":". Image processing of the adjustment item "tone curve" corresponding to the variable "adjustment item ID"="2" (S540) and thumbnail creation processing (S550) are executed for image data created in S240 in FIG. 1B using the acquired first "parameter value" "0:0". Then, the sum total of black pixels "0" and white pixels "255" is calculated from the image data after the image processing in S540, and is set in the "adjusted value". Assume that the calculated "adjusted value" is "95" in this example. The calculated "threshold" and "adjusted value" are compared (S560). As a result of comparison in S560, since the "adjusted value"="95" is larger than the "threshold"="20", it is determined that a color saturation occurs (YES in S570), and a ratio of occurrence of the color saturation is calculated (S580). A ratio of a value "75" obtained by subtracting the "threshold" from the "adjusted value" to the entire target image data is calculated. Assume that the calculation result is "75%" in this example. Since the calculation result="75%" falls within the range from "71% to 100%" (71% to 100% in S580), a large icon is composited to the thumbnail created in S550 (S610). After that, the process advances to S620 to process the next parameter "Param2".

Image processing (S540) and thumbnail creation processing (S550) are executed using the second "parameter value" "80:128". Then, the sum total of black pixels "0" and white pixels "255" is calculated from the image data after the image processing in S540, and is set in the "adjusted value". Assume that the calculated "adjusted value" is "60" in this example. The calculated "threshold" and "adjusted value" are compared (S560). As a result of comparison in S560, since the "adjusted value"="60" is larger than the "threshold"="20", it is determined that a color saturation occurs (YES in S570), and a ratio of occurrence of the color saturation is calculated (S580). A ratio of a value "40" obtained by subtracting the "threshold" from the "adjusted value" to the entire target image data is calculated. Assume that the calculation result is "40%" in this example. Since the calculation result="40%" falls within the range from "31% to 70%" (31% to 70% in S580), a middle icon is composited to the thumbnail created in S550 (S600). After that, the process advances to S620 to process the next parameter "Param3".

Image processing (S540) and thumbnail creation processing (S550) are executed using the third "parameter value" "128:128". Then, the sum total of black pixels "0" and white pixels "255" is calculated from the image data after the image processing in S540, and is set in the "adjusted value". Assume that the calculated "adjusted value" is "40" in this example. The calculated "threshold" and "adjusted value" are compared (S560). As a result of comparison in S560, since the "adjusted value"="40" is larger than the "threshold"="20", it is determined that a color saturation occurs (YES in S570), and a ratio of occurrence of the color saturation is calculated (S580). A ratio of a value "20" obtained by subtracting the "threshold" from the "adjusted value" to the entire target image data is calculated. Assume that the calculation result is "20%" in this example. Since the calculation result="20%" falls within the range from "1% to 30%" (1% to 30% in S580), a small icon is composited to the thumbnail created in S550 (S590). After that, the process advances to S620 to process the next parameter "Param4".

Image processing (S540) and thumbnail creation processing (S550) are executed using the fourth "parameter value" "128:200". Then, the sum total of black pixels "0" and white pixels "255" is calculated from the image data after the image processing in S540, and is set in the "adjusted value". Assume that the calculated "adjusted value" is "20" in this example. The calculated "threshold" and "adjusted value" are compared (S560). As a result of comparison in S560, since the "threshold"="20" is equal to the "adjusted value"="20", it is determined that no color saturation occurs (NO in S570), and the process jumps to S620 to process the next parameter "Param5".

Image processing (S540) and thumbnail creation processing (S550) are executed using the fifth "parameter value" "255:255". Then, the sum total of black pixels "0" and white pixels "255" is calculated from the image data after the image processing in S540, and is set in the "adjusted value". Assume that the calculated "adjusted value" is "20" in this example. The calculated "threshold" and "adjusted value" are compared (S560). As a result of comparison in S560, since the "threshold"="20" is equal to the "adjusted value"="20", it is determined that no color saturation occurs (NO in S570), and the process jumps to S620. If no parameters to be processed remain, the processing in FIG. 13 ends, and the process returns to S170 in FIG. 1A.

Next, the five thumbnails created by the processing in FIG. 13 are displayed on the "tone curve" thumbnail display area corresponding to the variable "adjustment item ID"="2" (S180). It is then determined if thumbnails are displayed on a field of the adjustment item "contrast" corresponding to the incremented count value "3" or more of the variable "adjustment item ID". Since no such thumbnails are displayed in FIG. 6 (NO in S190), the control waits for a user's input operation. At this time, the screen has a state immediately after the thumbnail of the first adjustment item is selected when the color saturations have occurred, as shown in FIG. 14.

Figure 14:
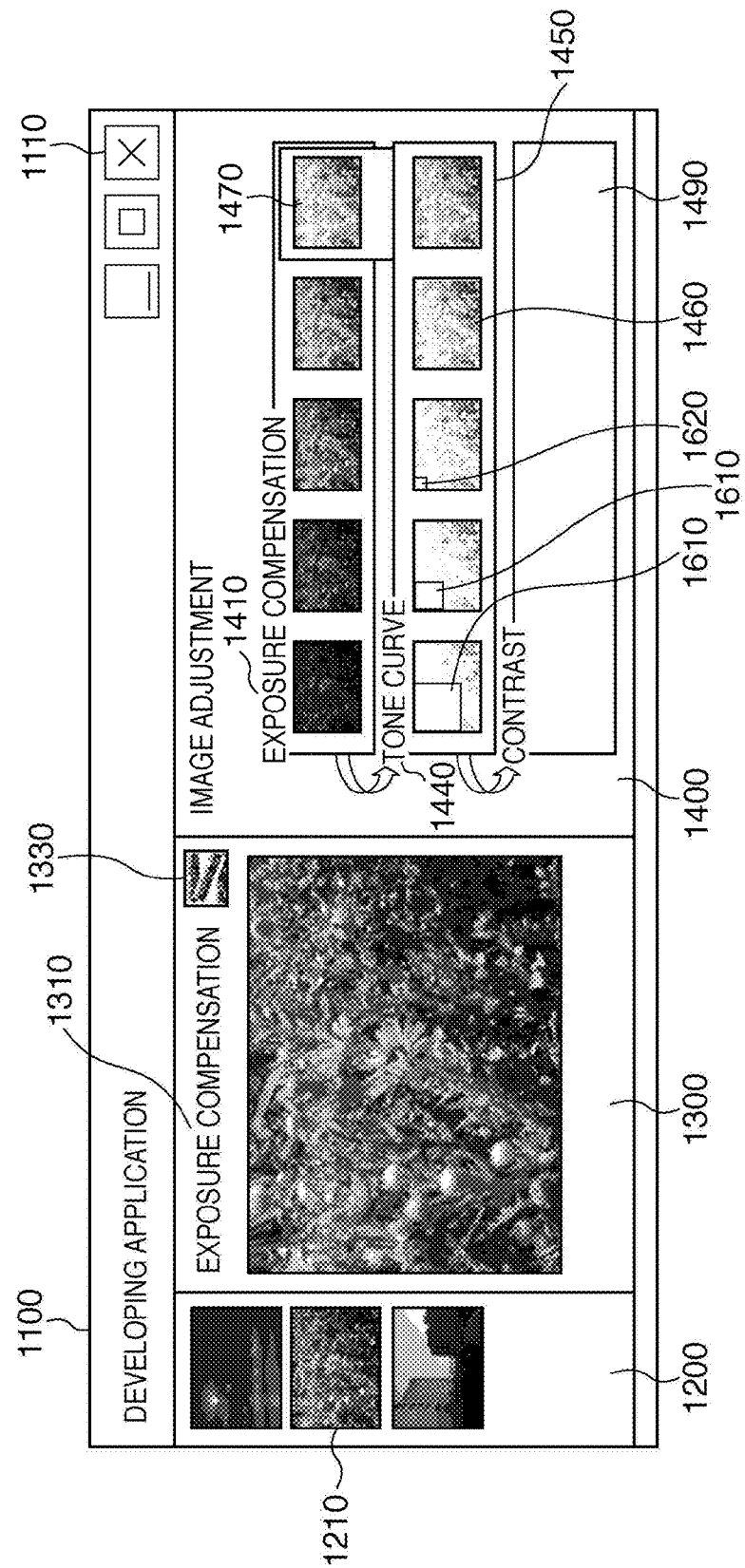
FIG. 14 is a view showing an example of a screen displayed by the image processing apparatus according to the present invention.

An image selection screen 1100 shown in FIG. 14 includes a program end button 1110, RAW image selection area 1200, image display area 1300, and adjustment item list display area 1400. Image data 1210 in the RAW image selection area 1200 is image data in the RAW image format, which serves as an image processing target. The image display area 1300 displays the currently processed image data. This image display area 1300 includes a currently adjusted item name 1310, target image display area 1320, and adjusted image store button 1330. The adjustment item list display area 1400 includes a first adjustment item "exposure compensation" 1410, and a decided parameter thumbnail 1470 of the first adjustment item "exposure compensation" 1410 decided by a user's operation. Also, the adjustment item list display area 1400 includes a second adjustment item "tone curve" 1440, a thumbnail display area 1450 of thumbnails using a plurality of parameters of the adjustment item 1440, and thumbnails 1460 based on the plurality of parameters of the adjustment item 1440. Furthermore, in the second adjustment item "tone curve" 1440, the processing results based on the plurality of parameters include a thumbnail 1600 including a large icon indicating the ratio of occurrence of the color saturation, a thumbnail 1610 including a middle icon indicating the ratio of occurrence of the color saturation, and a thumbnail 1590 including a small icon indicating the ratio of occurrence of the color saturation.

As described above, according to this embodiment, adjustment items are displayed according to the order of setting processes of a plurality of adjustment items. The processing result based on a parameter set by a user's operation and those based on a plurality of parameters of the next adjustment item are displayed as a list of thumbnails. When it is determined that a color saturation occurs for the processing result, such processing result is distinctly displayed by displaying an icon according to the ratio of occurrence of the color saturation on a thumbnail. As a result, the user can recognize occurrence of a color saturation due to the processing parameter value of the adjustment item upon image processing.

Third Embodiment

In this embodiment, image processing is applied to original image data in a RAW image data format using adjusted values of five different adjustment items "white balance", "exposure compensation", "tone curve", "contrast", and "color density" to generate and store image data in a compressed format such as JPEG. This embodiment will explain a case in which the order of settings of parameter values of the adjustment items is changed according to the characteristic of original image data.

The arrangement of an image processing apparatus of this embodiment is as shown in FIG. 2.

Figure 15:
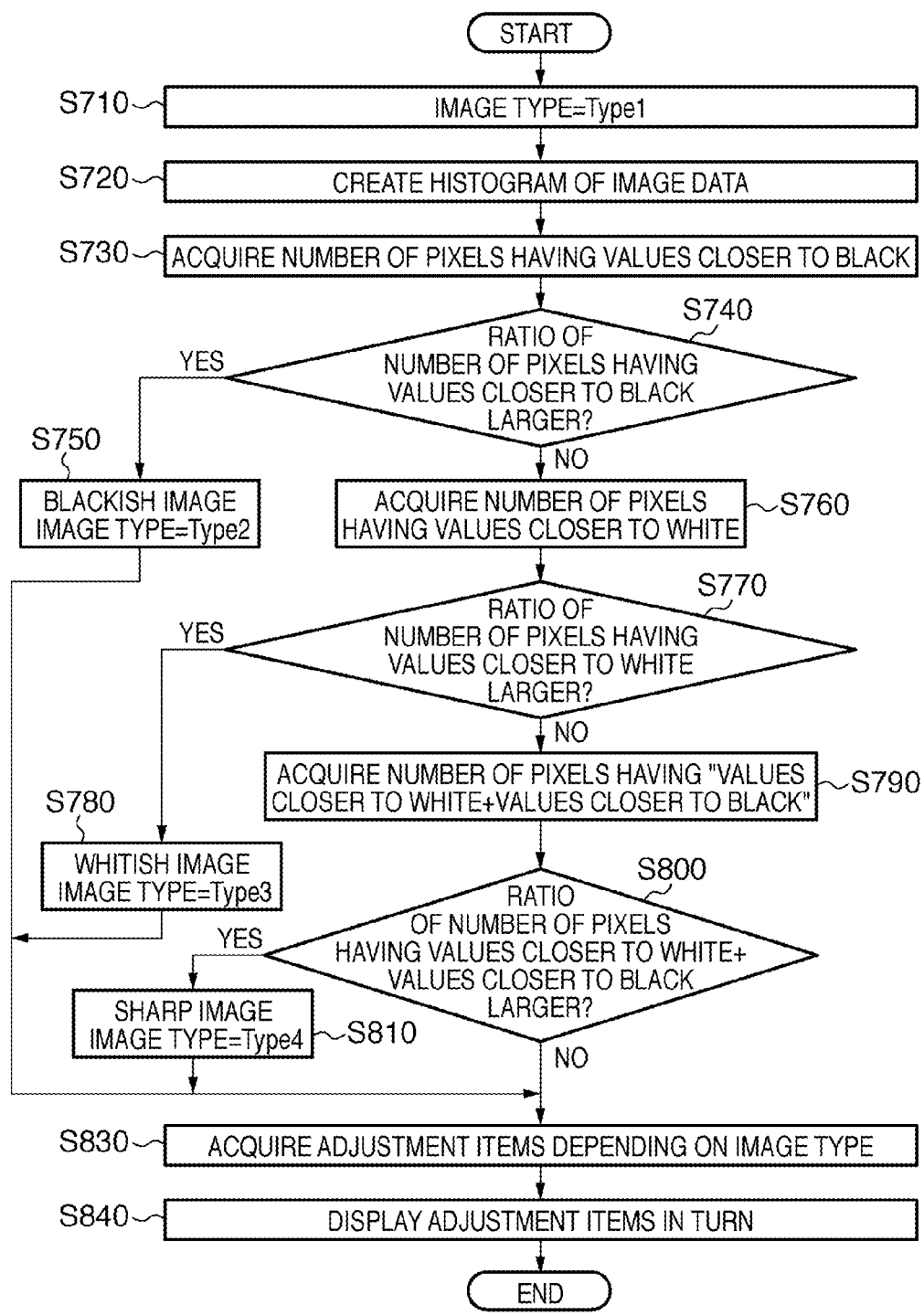
FIG. 15 is a flowchart showing an example of the operation sequence of the image processing apparatus according to the present invention.

The operation executed by the image processing apparatus in this embodiment will be described below with reference to FIGS. 1A and 1B. The following operation is implemented when a control unit (CPU) 100 of the image processing apparatus reads out and launches an image processing program and OS stored in a hard disk 110, and controls various modules according to them. The CPU 100 displays an initial screen shown in FIG. 5 on a display 140, and displays a list of thumbnail images corresponding to original image data stored in the hard disk 110 on a RAW image selection area 1200 (S100). The CPU 100 determines in response to a user's operation whether or not a thumbnail image corresponding to original image data to be processed is selected (S110). If the original image data to be processed is selected, the CPU 100 loads the original image data to be processed from the hard disk 110 (S120), executes drawing processing of the loaded image data, and displays the processed image data on an image display area 1300 (S130). The CPU 100 then displays parameter value setting fields classified for a plurality of adjustment items on an adjustment item list display area 1400 by executing the operation as shown in the flowchart of FIG. 15 to be described later (S140).

The CPU 100 substitutes "0" in an adjustment item ID (S150), and increments a count of the adjustment item ID by "1" (S160). The CPU 100 creates thumbnail images indicating the processing results using different parameter values in association with an adjustment item corresponding to the adjustment item ID by executing the operation as shown in the flowchart of FIG. 3 (S170), and displays the created thumbnail images on a corresponding adjustment item field on the adjustment item list display area 1400 (S180). The CPU 100 determines whether or not thumbnail images have already been displayed on adjustment item fields corresponding to adjustment item IDs obtained by further incrementing the current count of the adjustment item ID by "1" or more (S190). The CPU 100 deletes thumbnail images on the adjustment item field, which are determined to be displayed, to delete them (S200).

The CPU 100 determines in response to a user's operation if a thumbnail image displayed on the adjustment item list display area 1400 is selected (S210). If a thumbnail image is selected, the CPU 100 acquires an adjustment item ID corresponding to an adjustment item to which the thumbnail image belongs, and a parameter value corresponding to the thumbnail image (S220), and sets and holds the acquired parameter value in a field VALUE of that adjustment item (S225). The CPU 100 erases values set in fields VALUE of adjustment items corresponding to the adjustment item IDs obtained by further incrementing the count of the adjustment item ID acquired in step S220 by "1" or more (S230). The CPU 100 generates display image data by executing image processing to a copy of the original image data using the values set in the fields VALUE in association with the adjustment items that include values in their fields VALUE, and displays it as the processing result on the image display area 1300 (S240).

The CPU 100 sets an adjustment item ID to be that acquired in step S220 (S250), and compares this adjustment item ID with a maximum adjustment item ID to determine if the corresponding adjustment item is a last adjustment item (S260). As a result of comparison, if the adjustment item ID is smaller than the maximum adjustment item ID, the process returns to step S160; if the adjustment item ID is equal to the maximum adjustment item ID, the CPU 100 determines that the corresponding adjustment item is the last adjustment item, and the process advances to step S270.

The CPU 100 determines in response to a user's operation if a storage instruction of the image processing result is received (S270). If it is determined that the storage instruction is received, the CPU 100 generates storage image data by executing image processing to a copy of the original image data using the values set in the fields VALUE of the respective adjustment items (S280). The generated storage image data has a predetermined compression format, e.g., a JPEG format, and is stored in a predetermined storage area of the hard disk 110 after a file name different from that of the original image data is given. After that, the CPU 100 determines in response to a user's operation if an end instruction is received (S290). If the end instruction is received, the CPU 100 ends this operation.

The operation executed by the CPU 100 in step S170 in this embodiment will be described below with reference to the flowchart of FIG. 3. The CPU 100 acquires, based on an adjustment item name corresponding to an image type and adjustment item ID, a record of the adjustment item name from a parameter table 1620 managed in the form of a table shown in FIG. 16B (S300). The CPU 100 sets "Param1" in a parameter Index (S310), reads out a value corresponding to "Param1" from the record, and sets it as a parameter value (S320). The CPU 100 applies image processing to a copy of the original image data using the value set as the parameter value (S330), and creates thumbnail image data from the processing result (S340). The CPU 100 increments the parameter Index by "1" (S350) and determines if values to be processed still remain in the record (S360). In this step, the CPU 100 determines whether or not the parameter Index reaches a maximum value. If the CPU 100 determines that values to be processed still remain in the record, the process returns to step S320; otherwise, it ends this operation.

The operation executed by the CPU 100 in step S140 in this embodiment will be described below with reference to the flowchart of FIG. 15. In the following description, original image data is analyzed to calculate a ratio of color data as the characteristic of the original image data. Then, the original image data is classified to a predetermined image type according to that characteristic, thus deciding the order of settings of a plurality of adjustment items.

The CPU 100 sets "Type1" in an image type (S710). The CPU 100 analyzes original image data to create a histogram having luminance values as the abscissa and pixels as the ordinate (S720). The CPU 100 acquires the number of pixels having values closer to black, i.e., luminance values ranging from "0 to 50" (S730), calculates a ratio of the acquired number of pixels to the total number of pixels, and determines if the calculated ratio is larger than a predetermined ratio (S740). In the description of this embodiment, assume that the predetermined ratio is 70%. If the ratio of pixels having values closer to black falls within a range from 71% to 100% in the entire image (YES in S740), the CPU 100 determines that the original image is a blackish image, and sets "Type2" in an image type (S750). On the other hand, if the ratio of pixels having values closer to black falls within a range from 0% to 70% in the entire image (NO in S740), the CPU 100 acquires the number of pixels having values closer to white, i.e., luminance values ranging from "200 to 255" (S760), calculates a ratio of the acquired number of pixels to the total number of pixels, and determines if the calculated ratio is larger than the predetermined ratio (S770). If the ratio of pixels having values closer to white falls within a range from 71% to 100% in the entire image (YES in S770), the CPU 100 determines that the original image is a whitish image, and sets "Type3" in an image type (S780). On the other hand, if the ratio of pixels having values closer to white falls within a range from 0% to 70% in the entire image (NO in S770), the CPU 100 acquires a sum of the number of pixels having values closer to black, i.e., luminance values ranging from "0 to 50" and the number of pixels having values closer to white, i.e., luminance values ranging from "200 to 255" (S790), calculates a ratio of the acquired sum to the total number of pixels, and determines if the calculated ratio is larger than the predetermined ratio (S800). If the ratio of the sum of the number of pixels having values closer to black and the number of pixels having values closer to white falls within a range from 71% to 100% in the entire image (YES in S800), the CPU 100 determines that the original image is a sharp image, and sets "Type4" in an image type (S810). On the other hand, if the ratio of the sum of the number of pixels having values closer to black and the number of pixels having values closer to white falls within a range from 0% to 70% in the entire image (NO in S800), the CPU 100 keeps setting "Type1" as the image type.

The CPU 100 acquires the setting order of adjustment items corresponding to the image type set in this way from an adjustment item table shown in FIG. 16A (S830). The table shown in FIG. 16A stores setting information of values of corresponding adjustment items in turn in ascending order of adjustment item ID in correspondence with the image types. The CPU 100 sorts the parameter value setting fields classified for respective adjustment items in the acquired setting order of adjustment items, and displays them on the adjustment item list display area 1400 (S840).

Figure 17:
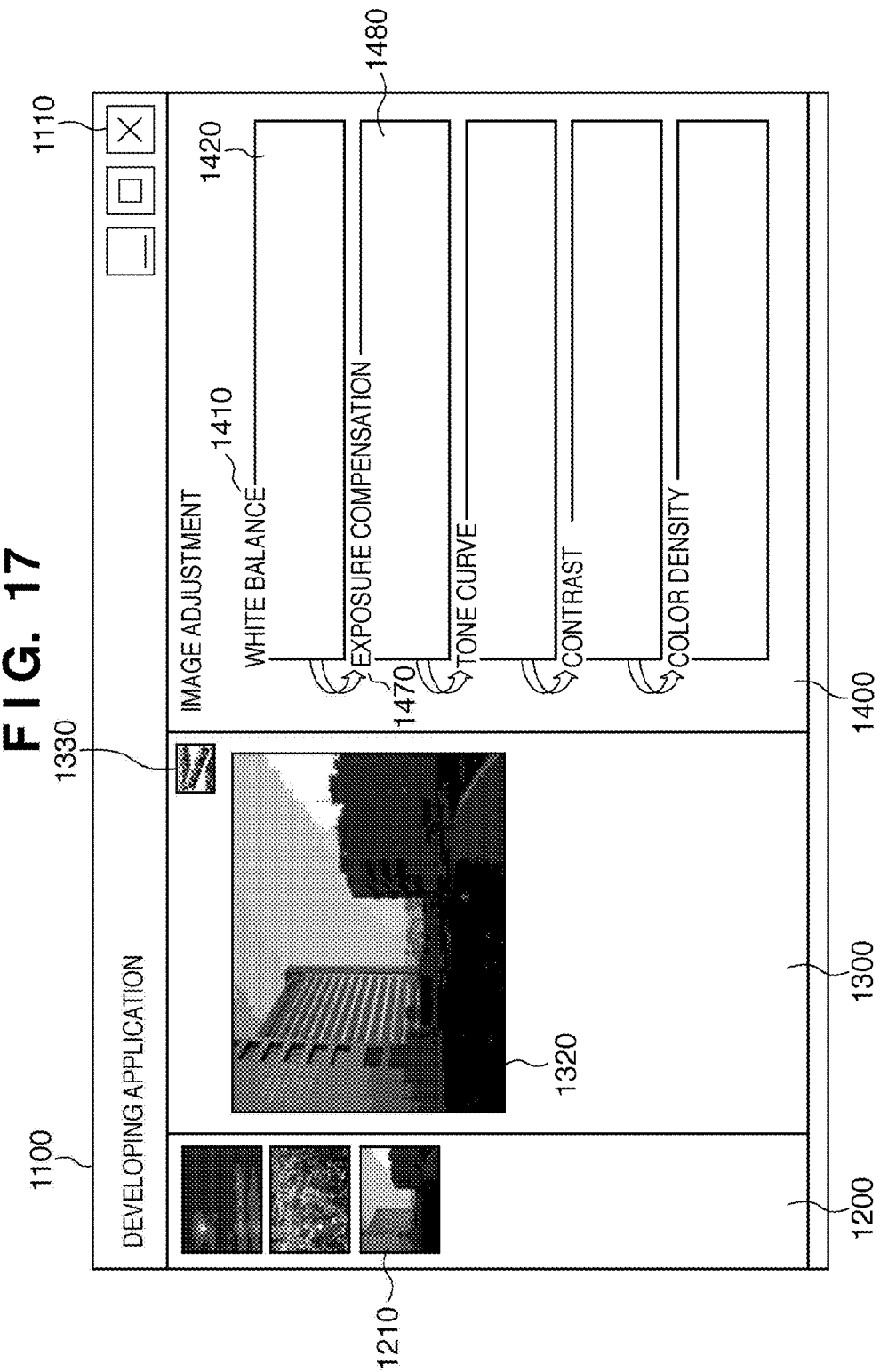
FIG. 17 is a view showing an example of a screen displayed by the image processing apparatus according to the present invention.

FIG. 17 shows an example of the adjustment item list display area 1400 displayed in step S840. In FIG. 17, a thumbnail image 1210 is selected. Also, FIG. 17 shows a state in which the CPU 100 sets "Type1" as an image type as a result of analysis of original image data corresponding to the thumbnail image 1210, and displays the adjustment items in turn from the top in accordance with the setting order obtained with reference to FIG. 16A.

As described above, according to this embodiment, the color balance of original image data is analyzed, and the order of setting processes of a plurality of adjustment items is decided based on the analysis result. As a result, the setting processes of adjustment items can be executed in an order that hardly causes a color saturation, thus guiding user's operations so that the image processing result can be prevented from suffering a shadow saturation or highlight saturation, and a desired image processing result of the user can be promptly obtained.

This embodiment has explained the case in which the color balance of original image data is analyzed. Alternatively, another characteristic of original image data may be analyzed, and the order of setting processes of a plurality of adjustment items may be decided according to the analysis result. For example, the brightness of original image data may be analyzed, and when the brightness has a large bias, the image type may be set to have an order of "exposure", "white balance", and "other adjustment items". Alternatively, the tincture of original image data may be analyzed, and when the tincture has a large bias, the image type may be set to have an order of "white balance", "exposure", and "other adjustment items". Alternatively, the noise amount of original image data may be analyzed, and when the noise amount is large, the image type may be set to have an order of "noise reduction" and "other adjustment items". In this way, the user can set adjustment items in an order optimal to the characteristic of original image data, and can obtain a desired image processing result more easily.

In the description of this embodiment, the value setting fields corresponding to all the adjustment items are sorted and displayed at the same time in step S140. In this case, the user can easily recognize the full scope of the setting sequence of adjustment items.

However, the present invention is not limited to this. For example, the value setting fields corresponding to adjustment items may be additionally displayed in turn in accordance with the setting order. For example, the value setting field of the first adjustment item is displayed, and after completion of the setting of the first adjustment item, the value setting field of the second adjustment item is additionally displayed. As a result, the user can surely set respective adjustment items without forgetting to set an arbitrary adjustment item.

The aforementioned embodiments have exemplified the case in which image processing is applied to original image data having a RAW image data format. Also, the present invention can be similarly applied to a case in which image processing is applied to an image file having another format such as JPEG or BMP in association with adjustment items such as "tone curve", "contrast", and "sharpness".

Other Embodiments

The objects of the present invention can also be achieved when a storage medium which records a program code of software that can implement the functions of the aforementioned embodiments is supplied to a system or apparatus. That is, the objects of the present invention can be achieved when a computer (CPU or MPU) of that system or apparatus reads out and executes the program code stored in the storage medium.

In this case, the program code itself read out from the storage medium implements the functions of the aforementioned embodiments, and the storage medium that stores the program code constitutes the present invention.

As the storage medium used to supply the program code, for example, a flexible disk, hard disk, optical disk, magneto-optical disk, CD-ROM, CD-R, magnetic tape, nonvolatile semiconductor memory card, and ROM may be used. The functions of the aforementioned embodiments may be implemented when the computer executes the readout program code.

However, the present invention also includes a case in which an OS (Operating System) or the like, which runs on a computer, executes some or all of actual processes based on an instruction of the program code, and the functions of the aforementioned embodiments are implemented by these processes, needless to say.

Furthermore, the present invention includes a case in which the program code read out from the storage medium is written in a memory equipped on a function expansion board or unit, which is inserted in or connected to the computer. After that, a CPU or the like equipped on that function expansion board or unit executes some or all of actual processes based on an instruction of the program code, and the functions of the aforementioned embodiments are implemented by these processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-148317, filed Jun. 5, 2008, and 2009-125850, filed May 25, 2009, which are hereby incorporated by reference herein in their entirety.

What is claimed is:

1. An image processing apparatus comprising:
a processor; and
a memory configured to store at least one program executable by the processor, at least one program comprising program code that, when executed by the processor, implements:
an acquisition unit configured to analyze image data and acquire a characteristic of the image data;
a decision unit configured to decide a setting order of adjustment items, based on the acquired characteristic of the image data, wherein the adjustment items correspond to image processes to be executed on the image data;
an image processing unit configured to execute image processes corresponding to the adjustment items to the image data;
a display unit configured to display images that represent results of the image processes corresponding to each of adjustment items based on the plurality of values belonging to each of the adjustment items, in the setting order;
a selection unit configured to select one of the plurality of displayed images for each of the adjustment items; and
a setting unit configured to set a value corresponding to the selected image for each of the adjustment items,
wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

2. The apparatus according to claim 1, further comprising: a deletion unit configured to delete, when another image is selected from the plurality of displayed images for one of the adjustment items by said selection unit, images that represent results of the image processes corresponding to each of later adjustment items of which the setting order is later than the setting order of the adjustment item based on the plurality of values belonging to each of the later adjustment items.

3. The apparatus according to claim 1, further comprising: a generation unit configured to execute an image process to the image data based on the values set for each of the adjustment items, and to generate new image data having a format different from the image data.

4. The apparatus according to claim 1, wherein said acquisition unit acquires the distribution of the colors of the image data to calculate at least one of a color balance, brightness and tincture of the image data as the characteristic.

5. The apparatus according to claim 1, further comprising: a determination unit configured to determine whether or not a color saturation has occurred in a result of the image process executed by said image processing unit; a calculation unit configured to calculate a degree of color saturation for image data which is determined by said determination unit that the color saturation has occurred; and a saturation degree display unit configured to distinctly display the degree of color saturation calculated by said calculation unit along with an image that represents the result of the image process which is determined that the color saturation has occurred.

6. An image processing method implemented by a processor comprising:
an acquisition step of analyzing image data and acquiring characteristic of the image data;
a decision step of deciding a setting order of adjustment items, based on the acquired characteristic of the image data, wherein the adjustment items correspond to image processes to be executed on the image data;
an image processing step of executing image processes corresponding to the adjustment items to the image data;
a displaying step of displaying images that represent results of the image processes corresponding to each of the adjustment items based on the plurality of values belonging to each of the adjustment items, in the setting order;
a selection step of selecting one of the plurality of displayed images for each of the adjustment items; and
a setting step of setting a value corresponding to the selected image for each of the adjustment items,
wherein said display step displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

7. A non-transitory computer-readable storage medium, which stores a software program that causes a computer execute as an image processing apparatus, comprising:
an acquisition unit configured to analyze image data and acquire a characteristic of the image data;
a decision unit configured to decide a setting order of adjustment items, based on the acquired characteristic of the image data, wherein the adjustment items correspond to image processes to be executed on the image data;
an image processing unit configured to execute image processes corresponding to the adjustment items to the image data;
a display unit configured to display images that represent results of the image processes corresponding to each of the adjustment items based on the plurality of values belonging to each of the adjustment items, in the setting order;
a selection unit configured to select one of the plurality of displayed images for each of the adjustment items; and
a setting unit configured to set a value corresponding to the selected image for each of the adjustment items,
wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

8. An image processing apparatus comprising:
a processor; and
a memory configured to store at least one program executable by the processor, at least one program comprising program code that, when executed by the processor, implements:
an acquisition unit configured to analyze image data and acquire a characteristic of the analyzed image data;
a decision unit configured to decide a setting order of adjustment items for the analyzed image data, based on the acquired characteristic of the analyzed image data, wherein the adjustment items correspond to image processes to be executed on the analyzed image data;
an image processing unit configured to execute image processes corresponding to the adjustment items to the image data;
a display unit configured to display images that represent results of the image processes corresponding to each of adjustment items based on the plurality of values belonging to each of the adjustment items, in the setting order;
a selection unit configured to select one of the plurality of displayed images for each of the adjustment items; and
a setting unit configured to set a value corresponding to the selected image for each of the adjustment items,
wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

9. The apparatus according to claim 8, further comprising: a deletion unit configured to delete, when another image is selected from the plurality of displayed images for one of the adjustment items by said selection unit, images that represent results of the image processes corresponding to each of later adjustment items of which the setting order is later than the setting order of the adjustment item based on the plurality of values belonging to each of the later adjustment items.

10. The apparatus according to claim 8, further comprising:
a generation unit configured to execute an image process to the image data based on the values set for each of the adjustment items, and to generate new image data having a format different from the image data.

11. The apparatus according to claim 8, wherein said acquisition unit acquires the distribution of the colors of the image data to calculate at least one of a color balance, brightness and tincture of the image data as the characteristic.

12. The apparatus according to claim 8, further comprising:
a determination unit configured to determine whether or not a color saturation has occurred in a result of the image process executed by said image processing unit;
a calculation unit configured to calculate a degree of color saturation for image data which is determined by said determination unit that the color saturation has occurred; and
a saturation degree display unit configured to distinctly display the degree of color saturation calculated by said calculation unit along with an image that represents the result of the image process which is determined that the color saturation has occurred.

13. An image processing apparatus comprising:
a processor; and
a memory configured to store at least one program executable by the processor, at least one program comprising program code that, when executed by the processor, implements:
an image selection unit configured to select an image;
an acquisition unit configured to analyze selected image selected by the image selection unit and acquire a characteristic of the selected image;
a decision unit configured to decide a setting order of adjustment items for the selected image, based on the acquired characteristic of the selected image, wherein the adjustment items correspond to image processes to be executed on the selected image;
an image processing unit configured to execute image processes on the selected image corresponding to the adjustment items to the selected image;
a display unit configured to display images that represent results of the image processes corresponding to each of adjustment items based on the plurality of values belonging to each of the adjustment items, in the setting order;
a selection unit configured to select one of the plurality of displayed images for each of the adjustment items; and
a setting unit configured to set a value corresponding to the selected displayed image selected by the selection unit for each of the adjustment items,
wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

14. The apparatus according to claim 13, further comprising:
a deletion unit configured to delete, when another image is selected from the plurality of displayed images for one of the adjustment items by said selection unit, images that represent results of the image processes corresponding to each of later adjustment items of which the setting order is later than the setting order of the adjustment item based on the plurality of values belonging to each of the later adjustment items.

15. The apparatus according to claim 13, further comprising:
a generation unit configured to execute an image process to the selected image based on the values set for each of the adjustment items, and to generate new image data having a format different from the selected image.

16. The apparatus according to claim 13, wherein said acquisition unit acquires the distribution of the colors of the selected image to calculate at least one of a color balance, brightness and tincture of the selected image as the characteristic.

17. The apparatus according to claim 13, further comprising:
a determination unit configured to determine whether or not a color saturation has occurred in a result of the image process executed by said image processing unit;
a calculation unit configured to calculate a degree of color saturation for image data which is determined by said determination unit that the color saturation has occurred; and
a saturation degree display unit configured to distinctly display the degree of color saturation calculated by said calculation unit along with an image that represents the result of the image process which is determined that the color saturation has occurred.

18. An image processing method implemented by a processor comprising:
an acquisition step of analyzing image data and acquiring a characteristic of the analyzed image data;
a decision step of deciding a setting order of adjustment items for the analyzed image data, based on the acquired characteristic of the analyzed image data, wherein the adjustment items correspond to image processes to be executed on the analyzed image data;
an image processing step of executing image processes corresponding to the adjustment items to the image data;
a displaying step of displaying images that represent results of the image processes corresponding to each of adjustment items based on the plurality of values belonging to each of the adjustment items, in the setting order;
a selection step of selecting one of the plurality of displayed images for each of the adjustment items; and
a setting step of setting a value corresponding to the selected image for each of the adjustment items,
wherein said display step displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

19. An image processing method implemented by a processor comprising:
an image selection step of selecting an image;
an acquisition step of analyzing selected image selected by the image selection unit and acquiring a characteristic of the selected image;
a decision step of deciding a setting order of adjustment items for the selected image, based on the acquired characteristic of the selected image, wherein the adjustment items correspond to image processes to be executed on the selected image;

an image processing step of executing image processes on the selected image corresponding to the adjustment items to the selected image;

a displaying step of displaying images that represent results of the image processes corresponding to each of adjustment items based on the plurality of values belonging to each of the adjustment items, in the setting order;

a selection step of selecting one of the plurality of displayed images for each of the adjustment items; and a setting step of setting a value corresponding to the selected displayed image, selected in the selection step, for each of the adjustment items, wherein said display step displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

20. A non-transitory computer-readable storage medium, which stores a software program that causes a computer to execute as an image processing apparatus, comprising:

an acquisition unit configured to analyze image data and acquire a characteristic of the analyzed image data;

a decision unit configured to decide a setting order of adjustment items for the analyzed image data, based on the acquired characteristic of the analyzed image data, wherein the adjustment items correspond to image processes to be executed on the analyzed image data;

an image processing unit configured to execute image processes corresponding to the adjustment items to the image data;

a display unit configured to display images that represent results of the image processes corresponding to each of adjustment items based on the plurality of values belonging to each of the adjustment items, in the setting order;

a selection unit configured to select one of the plurality of displayed images for each of the adjustment items; and a setting unit configured to set a value corresponding to the selected displayed image for each of the adjustment items, wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

21. A non-transitory computer-readable storage medium, which stores a software program that causes a computer to execute as an image processing apparatus, comprising:

an image selection unit configured to select an image;

an acquisition unit configured to analyze selected image selected by the image selection unit and acquire a characteristic of the selected image;

a decision unit configured to decide a setting order of adjustment items for the selected image, based on the acquired characteristic of the selected image, wherein the adjustment items correspond to image processes to be executed on the selected image;

an image processing unit configured to execute image processes on the selected image corresponding to the adjustment items to the selected image;

a display unit configured to display images that represent results of the image processes corresponding to each of adjustment items based on the plurality of values belonging to each of the adjustment items, in the setting order;

a selection unit configured to select one of the plurality of displayed images for each of the adjustment items; and a setting unit configured to set a value corresponding to the selected displayed image, selected by the selection unit, for each of the adjustment items, wherein said display unit displays images not only representing results of the image process corresponding to one of the adjustment items based on the plurality of values belonging to the one adjustment item but also representing results of the image process corresponding to a former adjustment item of which the setting order is before the one adjustment item based on the value set for the former adjustment item.

* * * * *